(12) United States Patent
Gross

(10) Patent No.: US 10,068,471 B2
(45) Date of Patent: Sep. 4, 2018

(54) COLLISION AVOIDANCE AND TRAFFIC SIGNAL PREEMPTION SYSTEM

(71) Applicant: Collision Control Communications, Inc., Fort Wayne, IN (US)

(72) Inventor: Dave Gross, Fort Wayne, IN (US)

(73) Assignee: Collision Control Communications, Inc., Fort Wayne, IN (US)

( * ) Notice: Subject to any disclaimer, the term of this patent is extended or adjusted under 35 U.S.C. 154(b) by 0 days.

(21) Appl. No.: 15/582,586

(22) Filed: Apr. 28, 2017

(65) Prior Publication Data

US 2017/0236412 A1 Aug. 17, 2017

Related U.S. Application Data

(63) Continuation-in-part of application No. 14/976,607, filed on Dec. 21, 2015, now abandoned.

(60) Provisional application No. 62/328,856, filed on Apr. 28, 2016.

(51) Int. Cl.
| | |
|---|---|
| *G08G 1/087* | (2006.01) |
| *G08G 1/16* | (2006.01) |
| *G08G 1/0965* | (2006.01) |
| *G01S 19/13* | (2010.01) |

(52) U.S. Cl.
CPC .......... *G08G 1/087* (2013.01); *G08G 1/0965* (2013.01); *G08G 1/166* (2013.01); *G01S 19/13* (2013.01)

(58) Field of Classification Search
CPC .......... G08G 1/07; G08G 1/081; G08G 1/087; G08G 1/095; G08G 1/0965; G08G 1/166
See application file for complete search history.

(56) References Cited

U.S. PATENT DOCUMENTS

| | | |
|---|---|---|
| 2,355,607 A | 8/1944 | Shepard |
| 4,443,783 A | 4/1984 | Mitchell |
| 4,914,434 A | 4/1990 | Morgan et al. |
| 5,187,373 A | 2/1993 | Gregori |
| 5,187,476 A | 2/1993 | Hamer |
| 5,202,683 A | 4/1993 | Hamer et al. |
| 5,539,398 A | 7/1996 | Hall et al. |
| 5,602,739 A | 2/1997 | Haagenstad et al. |
| 5,926,113 A | 7/1999 | Jones et al. |
| 5,955,968 A | 9/1999 | Bentrott et al. |
| 5,986,575 A | 11/1999 | Jones et al. |
| 6,232,889 B1 | 5/2001 | Apitz et al. |
| 6,243,026 B1 | 6/2001 | Jones et al. |
| 6,326,903 B1 | 12/2001 | Gross et al. |
| 6,940,422 B1 | 9/2005 | Bachelder et al. |
| 7,113,108 B1 | 9/2006 | Bachelder et al. |
| 7,116,245 B1 | 10/2006 | Bachelder |

(Continued)

*Primary Examiner* — Orlando Bousono

(74) *Attorney, Agent, or Firm* — Taylor IP, P.C.

(57) ABSTRACT

A method of avoiding collisions and preempting traffic signals, including the steps of predicting a first likely travel route of a first vehicle along established roadways; predicting a second likely travel route of a second vehicle along the established roadways; preempting a normal operation of at least one traffic signal at an intersection of roadways along at least one of the first likely travel route and the second likely travel route allowing at least one of the first vehicle and the second vehicle to traverse the intersection; and determining whether both the first vehicle and the second vehicle will be at the intersection within a predefined time interval of each other.

14 Claims, 20 Drawing Sheets

(56) References Cited

U.S. PATENT DOCUMENTS

| | | |
|---|---|---|
| 7,307,547 B2 | 12/2007 | Schwartz |
| 7,327,280 B2 | 2/2008 | Bachelder et al. |
| 7,333,028 B2 | 2/2008 | Schwartz |
| 7,417,560 B2 | 8/2008 | Schwartz |
| 7,432,826 B2 | 10/2008 | Schwartz |
| 7,515,064 B2 | 4/2009 | Schwartz |
| 7,573,399 B2 | 8/2009 | Schwartz |
| 7,808,401 B1 | 10/2010 | Schwartz et al. |
| 7,952,491 B2 | 5/2011 | Schwartz et al. |
| 7,982,631 B2 | 7/2011 | Schwartz et al. |
| 8,072,346 B2 | 12/2011 | Hall et al. |
| 8,325,062 B2 | 12/2012 | Johnson |
| 8,344,908 B2 | 1/2013 | Johnson |
| 8,487,780 B2 | 7/2013 | Edwardson |
| 8,610,596 B2 | 12/2013 | Johnson |
| 8,823,548 B2 | 9/2014 | Johnson et al. |
| 8,830,085 B2 | 9/2014 | Edwardson et al. |
| 8,884,783 B2 | 11/2014 | Roberts et al. |
| 8,912,922 B2 | 12/2014 | Eichorst |
| 2004/0196162 A1 | 10/2004 | Brooke |
| 2005/0104745 A1 | 5/2005 | Bachelder et al. |
| 2005/0116838 A1 | 6/2005 | Bachelder et al. |
| 2005/0128103 A1 | 6/2005 | Bachelder |
| 2005/0264431 A1 | 12/2005 | Bachelder |
| 2006/0261977 A1 | 11/2006 | Bachelder |
| 2006/0273923 A1* | 12/2006 | Schwartz ............... G08G 1/07 340/906 |
| 2006/0273924 A1* | 12/2006 | Schwartz ............... G08G 1/087 340/907 |
| 2006/0273925 A1* | 12/2006 | Schwartz ............... G08G 1/087 340/907 |
| 2006/0273926 A1* | 12/2006 | Schwartz ............... G08G 1/07 340/907 |
| 2007/0008173 A1 | 1/2007 | Schwartz |
| 2007/0008174 A1 | 1/2007 | Schwartz |
| 2007/0040700 A1 | 2/2007 | Bachelder |
| 2008/0316055 A1 | 12/2008 | Bachelder et al. |
| 2009/0174540 A1* | 7/2009 | Smith ............... B60Q 1/34 340/465 |
| 2009/0174573 A1* | 7/2009 | Smith ............... G08G 1/0962 340/905 |
| 2009/0189782 A1 | 7/2009 | Bachelder |
| 2011/0068951 A1* | 3/2011 | Schwartz ............... G08G 1/087 340/906 |
| 2011/0084853 A1 | 4/2011 | Johnson |
| 2011/0084854 A1 | 4/2011 | Johnson |
| 2011/0109477 A1 | 5/2011 | Edwardson et al. |
| 2011/0115409 A1* | 5/2011 | Schwartz ............... G08G 1/087 315/297 |
| 2011/0115645 A1* | 5/2011 | Hall ............... G08G 1/087 340/907 |
| 2011/0169661 A1 | 7/2011 | Eichhorst |
| 2011/0193722 A1 | 8/2011 | Johnson |
| 2011/0234423 A1 | 9/2011 | Edwardson |
| 2011/0304476 A1 | 12/2011 | Johnson et al. |
| 2012/0188099 A1 | 7/2012 | Lee et al. |
| 2012/0218126 A1 | 8/2012 | Roberts et al. |
| 2013/0321174 A1 | 12/2013 | Eichhorst |
| 2015/0310737 A1 | 10/2015 | Simanowski et al. |
| 2015/0371538 A1 | 12/2015 | Eichhorst |

* cited by examiner

Left Turn Scenario

Right Turn Scenario

Neither Left Nor Right Turn Signal is Engaged

400G

Intersection Lat, Long (in decimal degrees):
41.104990, -85.090075

Traffic Light Defination (Name)
±15° sweet spot if ETA only and no GEO Windows (Δ < 30°)
Δ = minimum angle - maximum angle

| | |
|---|---|
| Intersect Angle 0 NB : | 163    (151-175) Δ = 24°  Midline = 163° |
| Intersect Angle 1 WB : | 88 |
| Intersect Angle 2 SB : | 308    (325 - 291) Δ = 34°  Midline = 163° |
| Intersect Angle 3 EB : | 267.9 |
| Intersect Angle 4 : | Not Set |
| Intersect Angle 5 : | Not Set |
| Intersect Angle 6 : | Not Set |
| Intersect Angle 7 : | Not Set |
| GEO Window NB 0 : | 41.044485; -85.235609; 41.043614; -85.235856; 41.044439; -85.235308 |
| GEO Window EB 1 : | 41.043614; -85.235856; 41.042813; -85.232958; 41.043284; -85.232878; 41.043831; -85.235736 |
| GEO Window SB 2 : | 41.043831; -85.235736; 41.043186; -85.236082; 41.043158; -85.235882; 41.043559; -85.235643 |
| GEO Window WB 3 : | 41.044413; -85.237539; 41.043559; -85.237539; 41.043559; -85.235643; 41.043755; -85.235439; 41.044669; -85.237217 |
| GEO Window 4 : | Not Set |
| GEO Window 5 : | Not Set |
| GEO Window 6 : | Not Set |
| GEO Window 7 : | Not Set |

Fig. 18

COLLISION AVOIDANCE AND TRAFFIC SIGNAL PREEMPTION SYSTEM

CROSS REFERENCE TO RELATED APPLICATIONS

This is a continuation-in-part application based upon U.S. non-provisional patent application Ser. No. 14/976,607, entitled "SYSTEM FOR PREEMPTING THE NORMAL FUNCTION OF TRAFFIC SIGNALS", filed Dec. 21, 2015, which is incorporated herein by reference. Further, this application is additionally based on U.S. provisional patent application Ser. No. 62/328,856, entitled "METHOD AND PROGRAMMING OF EMERGENCY VEHICLE TRAFFIC SIGNAL PREEMPTION AND COLLISION AVOIDANCE SYSTEM", filed Apr. 28, 2016, which is incorporated herein by reference.

BACKGROUND OF THE INVENTION

1. Field of the Invention

The present invention generally relates to traffic control systems, and more particularly to, a signal preemption system that prioritizes traffic signal changes to efficiently route an emergency vehicle, and which accounts for the proximity of vehicles as they are also proximate to an intersection having the traffic signal operation preempted.

2. Description of the Related Art

Emergency vehicles, such as fire-fighting engines, ambulances and police cars, generally have the need to cross or pass intersections under the control of traffic signals. This must be accomplished in the least amount of time possible so that the function of an emergency vehicle can be successfully fulfilled. It is generally understood that the more quickly an emergency vehicle can reach the scene of an emergency, the greater are the chances that the victims involved can be helped or successfully treated.

Since the earliest times, emergency vehicles approaching intersections have depended upon sirens, horns, bells or other types of audible and/or visible warning devices to alert other people in the intersection. This has not always proven to be a successful technique, even though it is still the standard mode of operation for emergency vehicles today. Unfortunately, accidents involving emergency vehicles often occur at intersections due to confusion, impaired hearing, inattention, noise conditions or overly-aggressive drivers seeking to clear the intersection before the arrival of the emergency vehicle. Other factors are the speed of the emergency vehicle and the resulting inability of others to react to it, distractions affecting the driver of the emergency vehicle, and the like. Further problems are caused when multiple emergency vehicles are approaching the same intersection. This situation is further complicated when the sirens and other signals from multiple emergency vehicles can be heard within the same area—a combination confusing to both pedestrians and other motorists, as well as the operators of both emergency vehicles. In many cases, due to siren noise and the intensity of focused driving at high speeds through congested areas, emergency vehicle operators are often not aware of other such vehicles in the same area.

During the course of emergency vehicles which are preempting traffic signals enroute to the scene, emergency vehicle drivers can often forget to use their turn signals. If a preemption-equipped emergency vehicle is about to make a left turn, for example, traffic signals to the left of the intersection will not begin their preemption sequence until after the left turn has been made. This may not allow for ample time for the next traffic signal in its path (following the turn) to effectively clear traffic along the route, slowing its response.

While emergency vehicles operate in proximity to each other there is a heightened chance of their colliding due to assumptions made on the part of the operators. A system that will predict the proximity of emergency vehicles at intersections is needed to reduce the likelihood of accidental collisions.

What is needed in the art is a system that can predictively preempt the normal operation of traffic signals and warn emergency vehicle drivers of the proximity of other emergency vehicles in such preempted intersections.

SUMMARY OF THE INVENTION

The present invention provides a system and method of preempting a normal operation of traffic signals and of providing collision avoidance information to the drivers of emergency vehicles.

The invention in one form is directed to a method of avoiding collisions and preempting traffic signals, including the steps of predicting a first likely travel route of a first vehicle along established roadways; predicting a second likely travel route of a second vehicle along the established roadways; preempting a normal operation of at least one traffic signal at an intersection of roadways along at least one of the first likely travel route and the second likely travel route allowing at least one of the first vehicle and the second vehicle to traverse the intersection; and determining whether both the first vehicle and the second vehicle will be at the intersection within a predefined time interval of each other.

The invention in another form is directed to a method of preempting traffic signals including the steps of: identifying at least one of a vehicle and an operator of the vehicle; comparing a situation of at least one of the identified vehicle and the identified operator with previous travel patterns of the at least one of the identified vehicle and the identified operator; predicting at least one likely travel path of the vehicle dependent upon the results of the comparing step; and preempting a normal operation of traffic signals along the at least one likely travel path of the vehicle.

An advantage of the traffic preemption system of the present invention is that it looks at historical traffic patterns to help clear traffic from a likely route.

Another advantage is that while the traffic preemption system allows the function of the turn signal to override the predicted path the collision avoidance system provides information to avoid a collision to emergency vehicle operators that are operating in proximity to each other.

Yet another advantage is that the system uses the habits of drivers to determine the likely travel routes.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 10 illustrates actual positions of "off-map" vehicles, which cannot be seen in the display of FIG. 8, and how arrows that relate to the locations of these other vehicles with which the driver may have a potential to collide with;

FIG. 18 illustrates details of an intersection of a specific latitude and longitude, that has been named to reflect the name of the intersection that is being programming to define Geo windows;

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
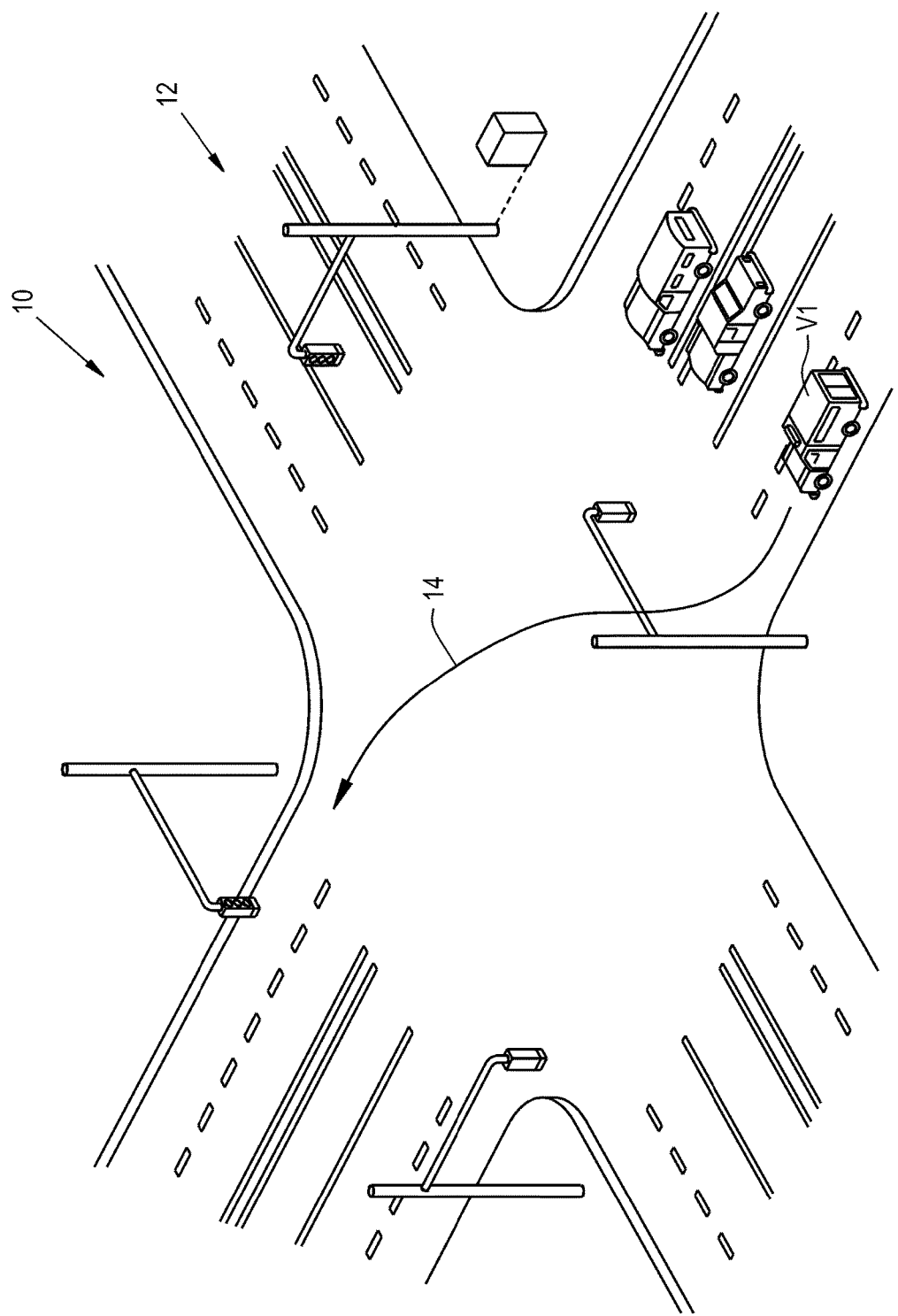
FIG. 1 is a perspective view of a traffic intersection where an embodiment of a traffic signal preemption system of the present invention is functioning.

Referring now to the drawings, and in particular to FIG. 1 there is shown a traffic intersection with a traffic light system 10 under the control of a traffic light preemption system 12 of the present invention. An emergency vehicle V1 is shown moving in direction 14 with the light system 10 stopping the normal flow of traffic so that vehicle V1 can proceed through the intersection with no, or at least minimalized traffic. The present invention identifies the type of vehicle, the vehicle itself and/or the driver of the vehicle and uses this information to predict the travel path of vehicle V1 toward a destination. The prediction is based on historical travel information of the type of the vehicle, the vehicle itself and/or the identified driver.

The present invention puts forward the concept of "intelligent predictive preemption", based on historical data. For the purposes of this invention, the term "preemption" can also mean transit signal priority for buses (TSP). The invention further allows the incorporation of geowindows, which are well known to those skilled in the discipline of traffic signal preemption and TSP (geowindows are disclosed in U.S. Pat. Nos. 5,986,575 and 8,912,922 among others). Geowindows may be created either by the intersection (as in U.S. Pat. No. 5,986,575), or by the vehicle (as in U.S. Pat. No. 8,912,922).

Figure 2:
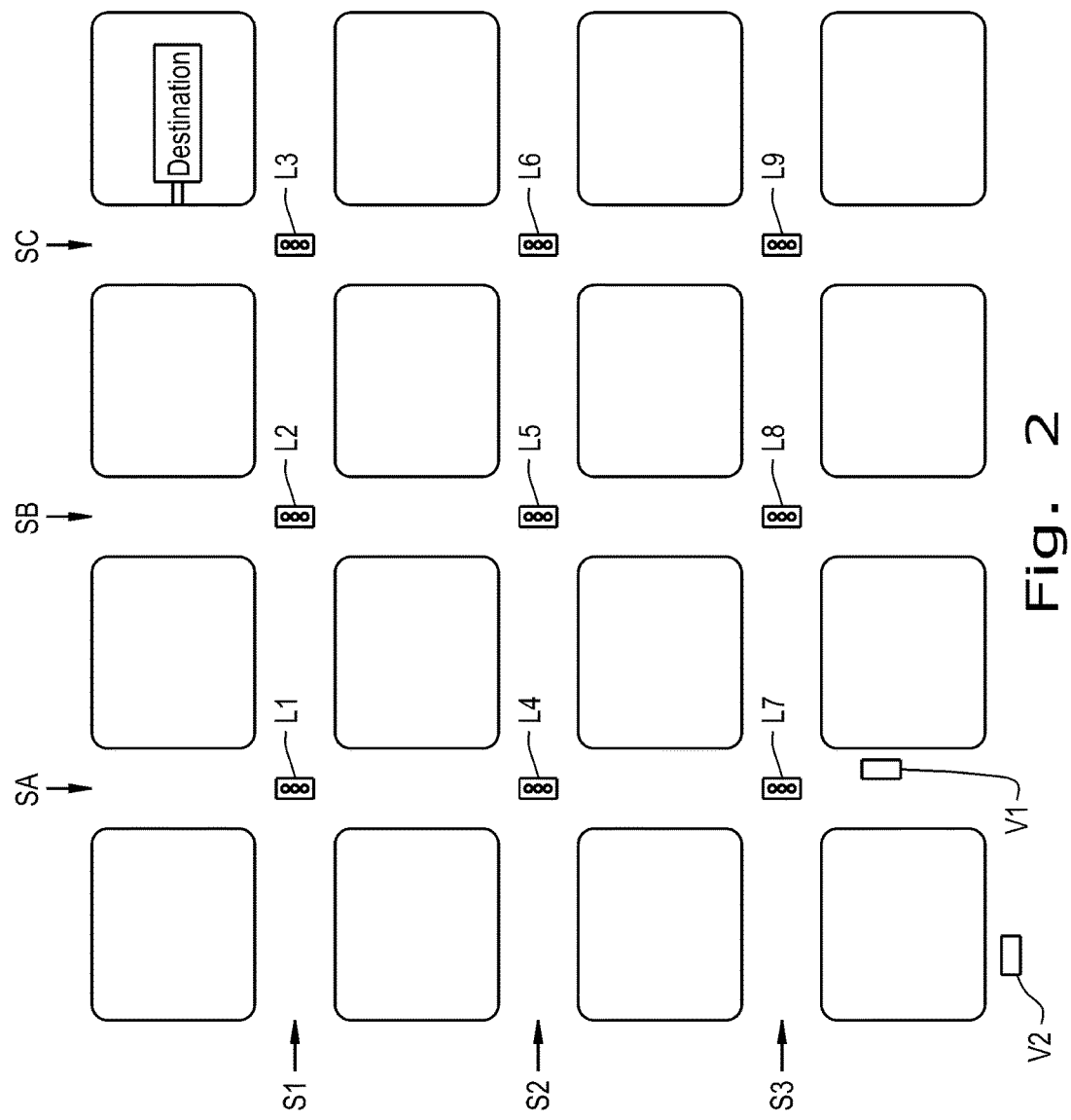
FIG. 2 is a generic top view of a series of streets that have the traffic signal preemption system of FIG. 1 installed therein, with this figure being used to discuss the system.

Now, additionally referring to FIG. 2 there is shown a generic grid of streets SA-SC and S1-S3, with a destination indicated. The present invention, when activated, receives information about the movement of vehicle V1 (by way of position detecting devices and active communication from vehicle V1) and preempts the operation of signal lights L1-L9 based on historical travel information. For ease of explanation we will assume that the destination is a hospital and vehicle V1 is an ambulance. As a first example we will discuss a scenario where only the type of vehicle is known and vehicle V1 has been identified as an ambulance. The historical travel patterns of ambulances shows that 80% of ambulances travel along street SA to light L1, turns right on street S1, then left on street SC at light L3 to arrive at the hospital. In this example, lights, L7, L4 and L1-L3 will be used, in a timed manner, to clear traffic so that vehicle V1 will have a statistically improved travel time to the hospital. It is also contemplated that lights L5, L6, L8 and L9 may be operated to move traffic away from the anticipated route.

Now, as a second example, we will assume that vehicle V1 has been identified as specifically No. 3 ambulance of the hospital. The historical travel pattern of No. 3 is that 75% of the time it takes street SA to street S2, turns right and continues on street S2 to street SC, turns left and proceeds straight to the hospital. In this case lights L7, L4, L5, L6 and L3 are used to preempt the normal working of these lights so that vehicle V1 can reach the destination in a statistically improved amount of time.

Now, as a third example, we will assume that vehicle V1 is being driven by an identified driver, here assumed to be Sally. Sally, as recorded in the historical travel database, 90% of the time turns right at light L7, proceeds along street S3 to light L9, turns left on street SC and then travels straight to the hospital. In this case lights L7-L9, L6 and L3 are used to preempt the normal working of these lights so that vehicle V1 can reach the destination in a statistically improved amount of time.

In the above scenarios if the driver uses a turn signal that is contrary to the predicted route, then the present invention responds to the turn signal selection to preempt traffic in that indicated route, and will release those lights from preemption which will now not be effected. For example if the No. 3 ambulance uses a turn signal to turn right at light L7, then the route along street S2 will be abandoned to normal operation and if a new likely route is predicted that route will anticipate the travel of No. 3.

In the above scenarios, if Sally were to use the left turn signal at light L7, and turn left on street S3 then the prediction to the hospital is abandoned, unless reestablished by some routing of vehicle V1 back toward the hospital. Here if Sally turns left at light L7 it may be predictive of a route to another hospital and the present invention adapts and establishes a predicted route thereto, using the preemption method of the present invention.

Figure 3:
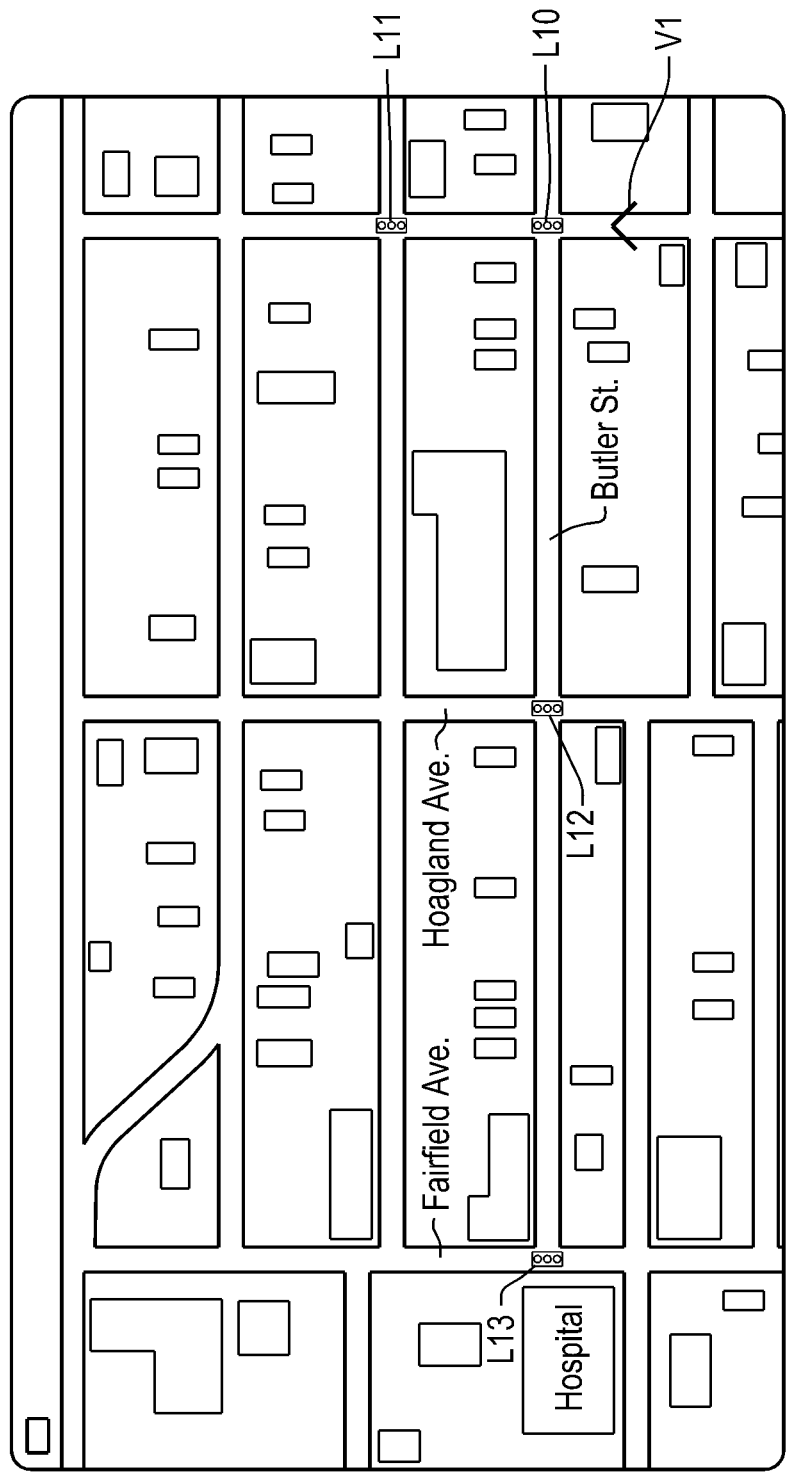
FIG. 3 is a top view of a series of streets that have the traffic signal preemption system of FIG. 1 installed therein, with this figure also being used to discuss the system.

To illustrate the advantage of the present invention it is important to understand the difference between the prior art and the inventive nature of the present invention, look now to FIG. 3, which depicts an ambulance traveling in a direction that is upward on the figure (assumed to be northbound) on a street. As would be expected, in prior art systems the next two traffic signals L10 and L11 in its northbound path have already been preempted in its favor. If the ambulance is going to make a left turn onto Butler Street enroute to the hospital, some preemption systems have the ability to read the turn signal status of the vehicle and begin preempting the traffic lights L12 and L13 at Butler and Hoagland Ave, and Butler and Fairfield Ave in its favor. However, if the driver of the ambulance has forgotten to engage his left turn signal, the status of the other two traffic lights on Butler traveling west toward the hospital will remain in normal operation until after the driver has turned left onto Butler. Upon turning left onto Butler, the two traffic signals L12 and L13 at Butler and Hoagland, and Butler and Fairfield will begin preemption sequences. It is commonly known in the field of traffic signal preemption that preemption requests are not always granted immediately. Many require a preemption "preamble" that must allow for minimum clearance times for pedestrians in opposing directions, and for minimum green time in opposing directions. This may prevent the remaining traffic signals enroute to the hospital on Butler from promptly clearing the intersections along the ambulance's path, and can lead to unnecessary delays.

This problem is overcome by the approach of the present invention. For example, if an ambulance normally turns left at a given intersection 90% of the time, and the driver has forgotten to engage his left turn signal, this system will automatically begin a preemption sequence for traffic lights to the left of the intersection, just in case he does turn left, based on historical preemption data. This approach involves the storage of preemption data (including how many times the vehicle has previously turned left/right or continued straight through the intersection), retrieval of this data (including vehicle ID, driver ID, direction of travel, speed, date and time of preemption initiation and termination for each event, direction of preemption, location of intersection), the aggregation of the data, its analysis, and the additional subsequent preemption of traffic signals in anticipation of the emergency vehicle's route based on an analysis of this historical data is logged, aggregated, analyzed and put in useful form for administrative personnel to review. The logs and data generated by this methodology may additionally, for example, be useful as a training tool to show how many times a particular emergency vehicle turned right or left, while failing to properly use turn signals prior to making those turns. This could allow supervisors to identify which drivers, if any, may be in need of additional safety training regarding the proper use of turn signals.

It is also contemplated that the preemption system can detect a sequence of vehicles, such as a convoy or a funeral procession, with the detection being a vehicle that is allowed a prolonged preemption with the system detecting and tracking an ending event to the convoy/procession, such as an ending vehicle that releases the intersection from the preemption process. For example, in FIG. 2 a vehicle V2 will be considered the ending vehicle and as vehicles V1 and V2 proceed in the same route the preemption process for the route is continued until being released by the movement of vehicle V2 through the particular intersection. It is also contemplated that this sort of preemption may be used without anticipating the movement of vehicle V1 through traffic using the wrong lanes of travel as shown in FIG. 1, where vehicle V1 is in what would be a normally oncoming traffic lane. It is further contemplated that the ending event can be simply the passage of a predetermined amount of time.

It is further contemplated that the traffic signal preemption of the present invention will also take into account the historical travel patterns relative to the time of day, the day of the week and other historical events, such as holidays and community events (such as sporting events). For example, if a driver typically takes one route in the morning to the destination and another in the afternoon to the destination, the present invention will weigh such behavior in the decision to preempt the normal function of the traffic systems accordingly. This advantageously allows the present invention to take advantage of the historical data that may be related to driving habits that may be based on otherwise uncontemplated routine occurrences. These uncontemplated occurrences may be simply the solar incidence in the morning along one route versus another route that causes the driver to take a certain route in the morning and a different route in the afternoon.

Figure 4:
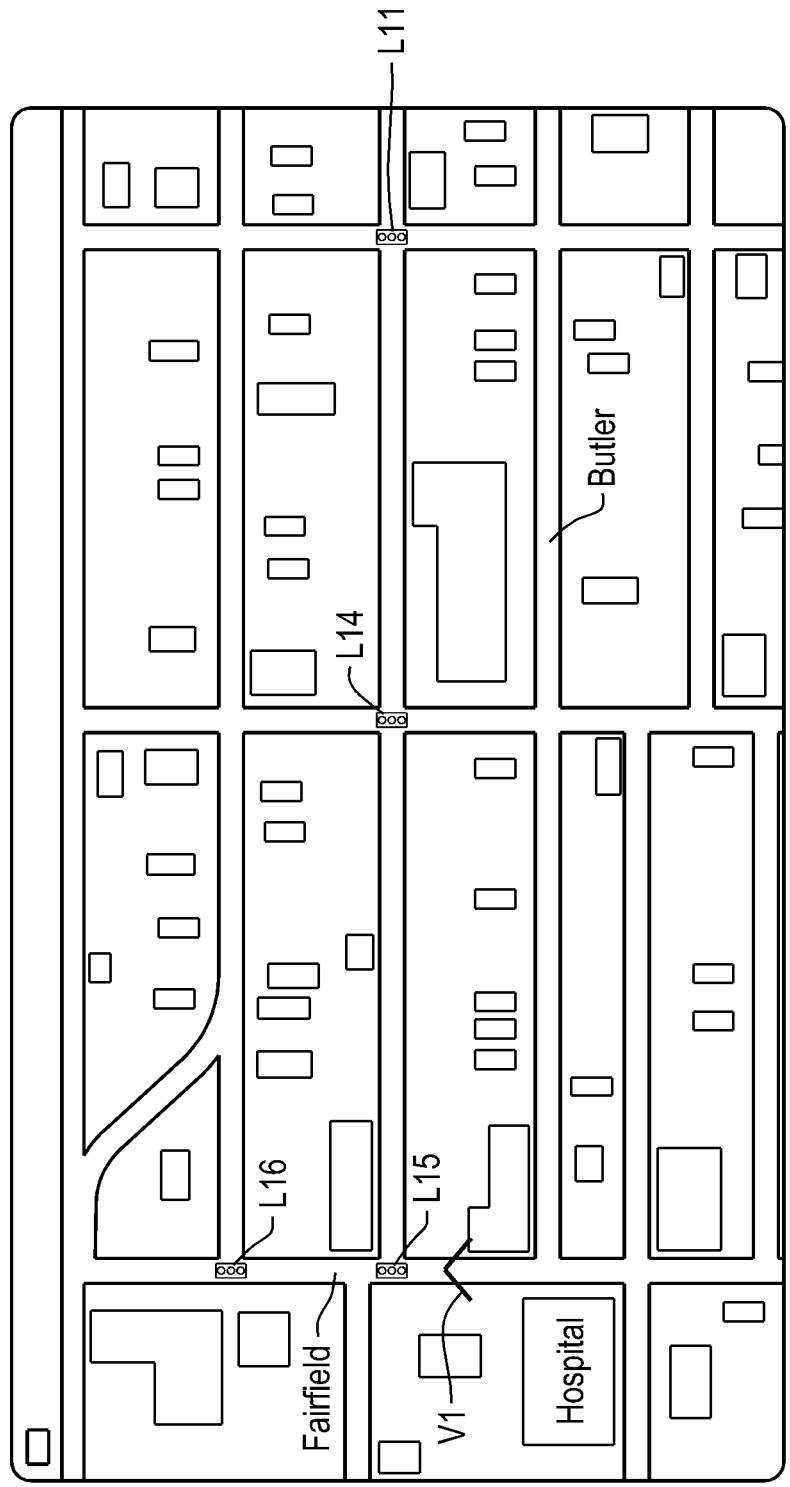
FIG. 4 is also a top view of a series of streets that have the traffic signal preemption system of FIG. 1 installed therein, with this figure also being used to discuss the system.
Figure 5:
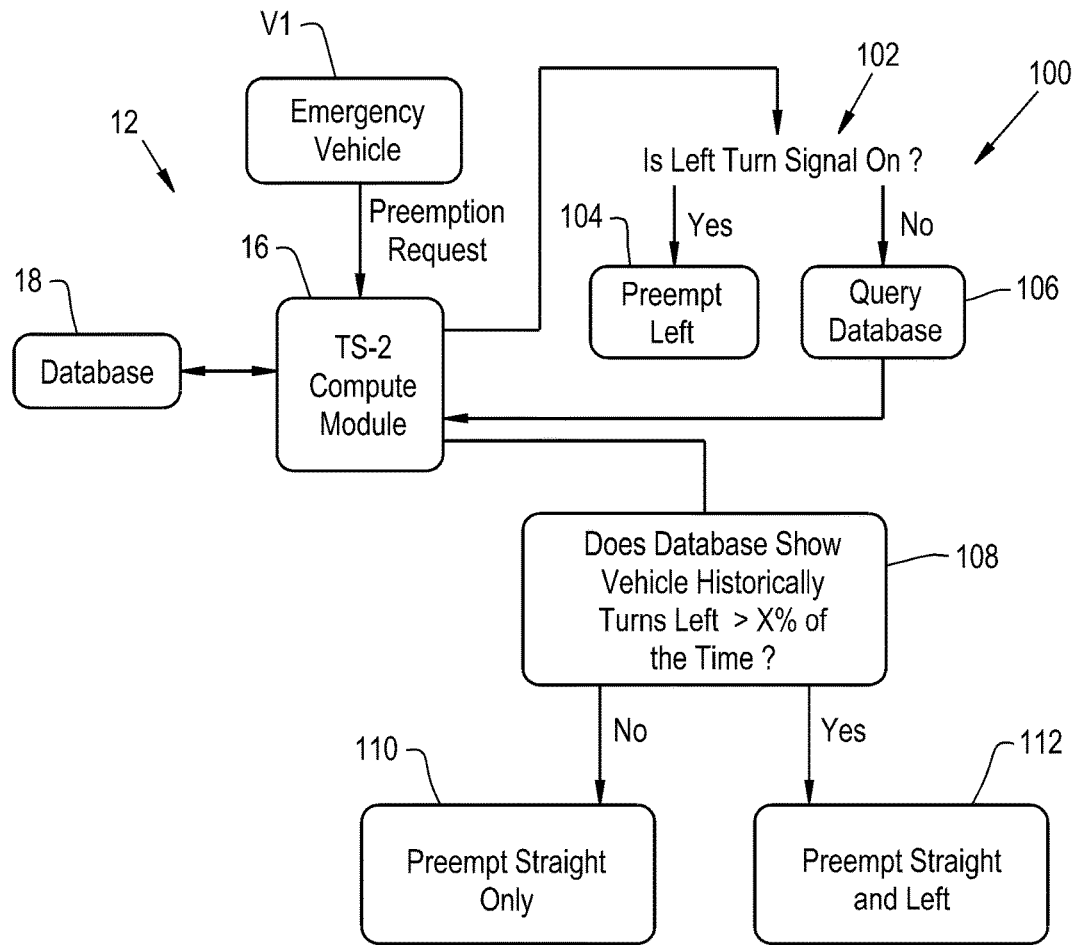
FIG. 5 is a chart that illustrates some of the functions of the traffic signal preemption system of the previous figures.
Figure 6:
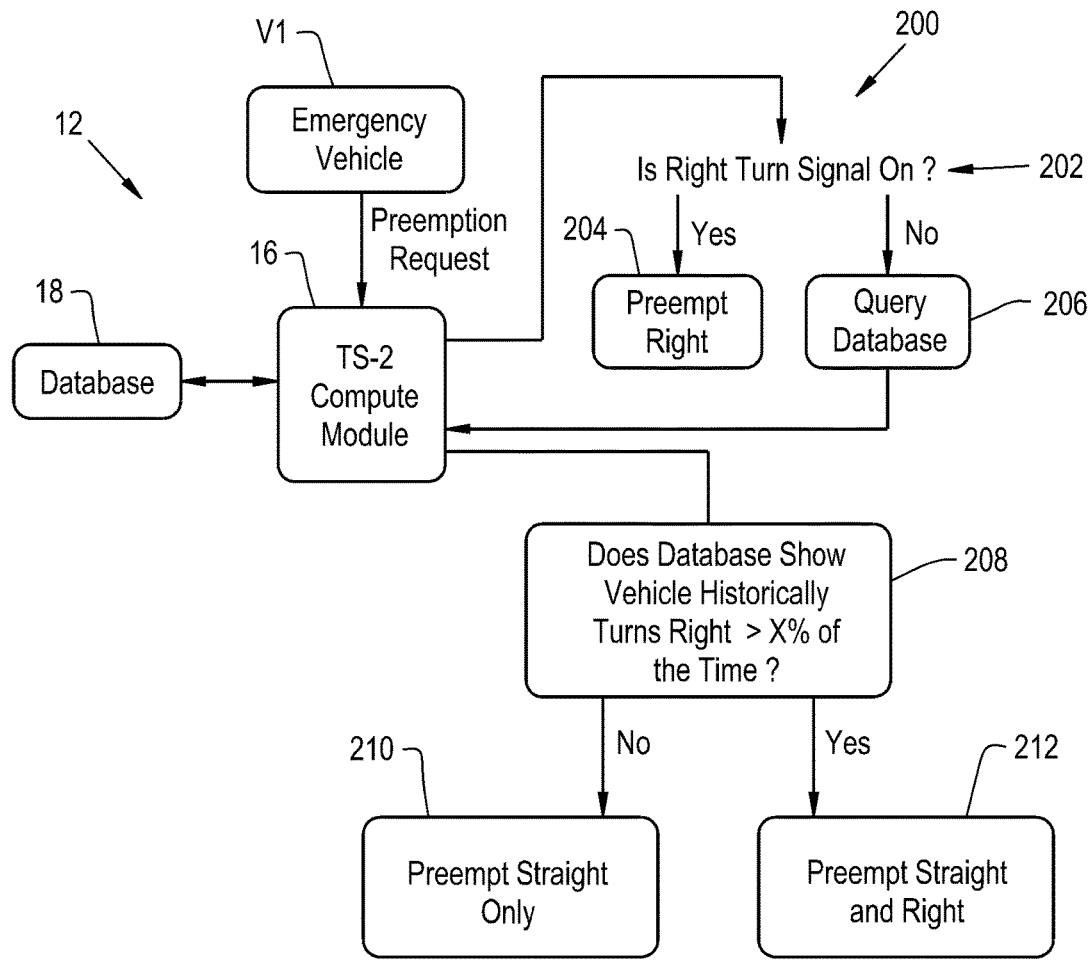
FIG. 6 is another chart that illustrates some of the functions of the traffic signal preemption system of the previous figures.
Figure 7:
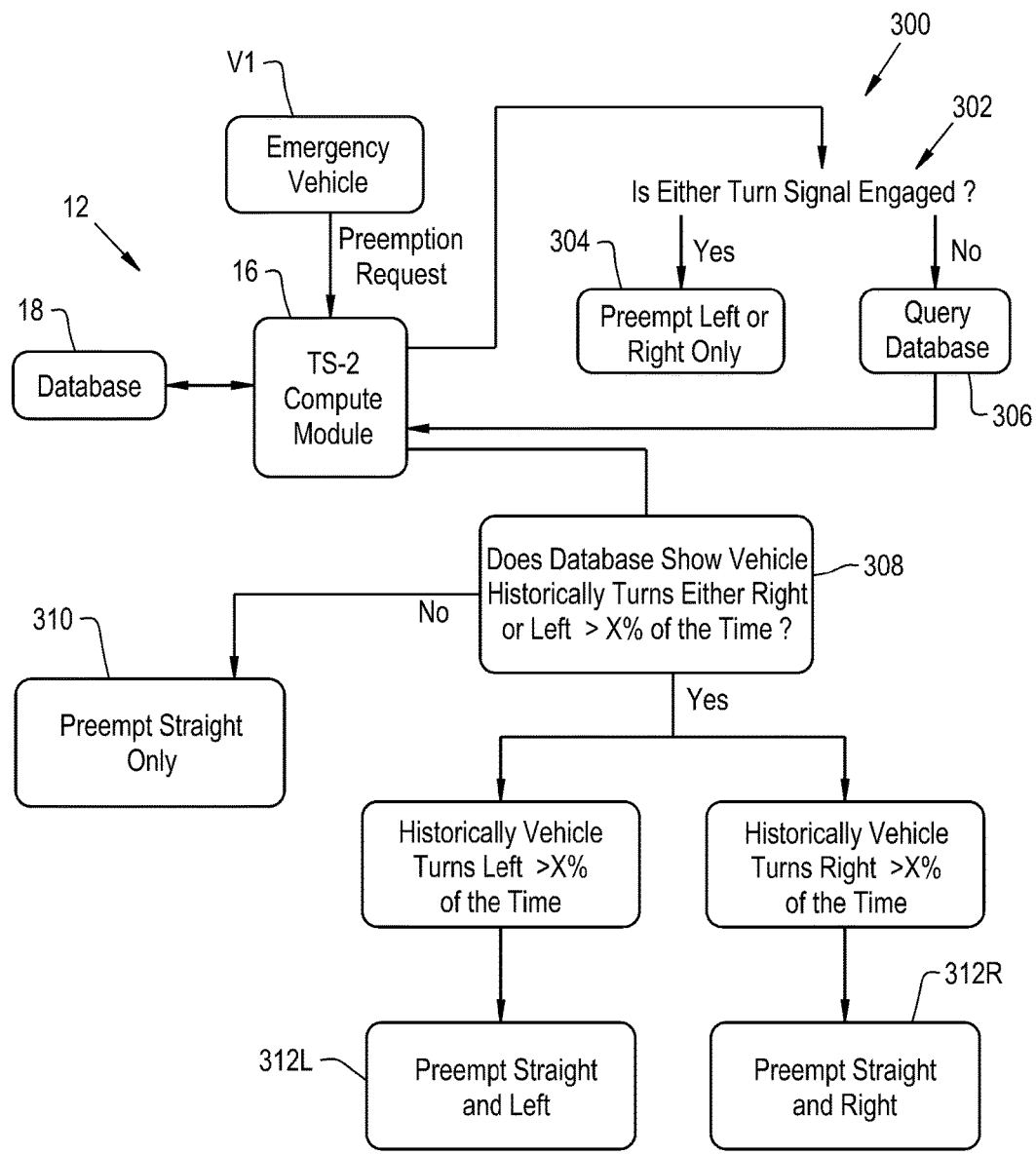
FIG. 7 is yet another chart that illustrates some of the functions of the traffic signal preemption system of the previous figures.

Now, additionally referring to FIG. 4 where lights L14-L16 are additionally identified, and to FIGS. 5-7 where combinations of function diagrams and flowcharts are used to further explain the operation of the present invention. In method 100 the logic behind a left turn is illustrated. Here vehicle V1 interacts with traffic preemption system 12 by making a preemption request to a traffic preemption device 16. Traffic preemption device 16 is in communication with a historical travel database 18, which stores historical travel patterns of vehicles that can request a traffic signal preemption from normal operations. At step 102 it is determined if the left turn signal is activated in vehicle V1, which can be in the form of a signal from a turn signal indicator or sensor, and if activated method 100 proceeds to step 104, otherwise method 100 proceeds to step 106.

At step 104 traffic preemption takes place dependent upon the use of a turn signal and method 100 continues to be available to assist in the preemption of a predicted pathway. Step 104 effectively overrides a contrary pathway prediction. However, if the left turn signal is in concert with the predicted path then the signal lights along that path are already in the mode of preempting their normal operation and the turn signal reinforces the already predicted travel path. As a result of arriving at step 104 lights L10, L12 and L13 will be preempted as vehicle V1 travels, see FIG. 3.

At step 106, database 18 is queried by device 16 to see what the identified type of vehicle, the identified specific vehicle and/or the driver of the vehicle generally does at upcoming intersections. At step 108 that follows, if vehicle V1 historically turns left at an intersection more than a predetermined percentage of the time then method 100 proceeds to step 112 and if not then to step 110. The method then repeats.

At step 110, if vehicle V1 is as shown in FIG. 3 then lights L10 and L11 are selected for preemption, since the historically left turn percentage is below the predetermined amount. Of course if vehicle V1 turns left then system 12 seeks to determine a new predicted pathway.

At step 112, lights L10-L13 are all selected for preemption since there is a reasonably high probability that vehicle V1 will turn left. The preemption of both the straight forward direction as well as the left turn is to accommodate the two likely travel paths of vehicle V1.

Now, reviewing a method 200, illustrated in FIG. 6, which is similar to the steps of method 100, with 100 added to the similar step numbers, and what is generally stated about method 100 is true of method 200 with the direction being addressed being right instead of left. The actions of vehicle V1 will be discussed relative to FIG. 4 as vehicle V1 is traveling on Fairfield.

At step 202 it is determined if the right turn signal is activated in vehicle V1, which can be in the form of a signal from a turn signal indicator or sensor, and if activated method 200 proceeds to step 204, otherwise method 200 proceeds to step 206.

At step 204 traffic preemption takes place dependent upon the use of a turn signal and method 200 continues to be available to assist in the preemption of a predicted pathway. Step 204 effectively overrides a contrary pathway prediction. However, if the right turn signal is in concert with the predicted path then the signal lights along that path are already in the mode of preempting their normal operation and the turn signal reinforces the already predicted travel path. As a result of arriving at step 204 lights L15, L14 and L11 will be preempted as vehicle V1 travels right at the next intersection, see FIG. 4.

At step 206, database 18 is queried by device 16 to see what the identified type of vehicle, the identified specific vehicle and/or the driver of the vehicle generally does at upcoming intersections. At step 208 that follows, if vehicle V1 historically turns right at an intersection more than a predetermined percentage of the time then method 200 proceeds to step 212 and if not then to step 210. The method then repeats.

At step 210, if vehicle V1 is as shown in FIG. 4 then lights L15 and L16 are selected for preemption, since the historically right turn percentage is below the predetermined amount. Of course if vehicle V1 turns right then system 12 seeks to determine a new predicted pathway.

At step 212, lights L15, L16, L 14 and L11 are all selected for preemption since there is a reasonably high probability that vehicle V1 will turn right. The preemption of both the straight forward direction as well as the right turn is to accommodate the two likely travel paths of vehicle V1 in this scenario.

Now, reviewing a method 300, illustrated in FIG. 7, as a combining of methods 100 and 200, which is similar to the steps of both method 100 and 200, with a multiple of 100 added to the similar step numbers, and what is generally stated about methods 100 and 200 is true of method 300 with the direction being addressed being both right and left as well as no turn. The actions of vehicle V1 will be discussed relative to FIGS. 3 and 4 as previously discussed relative to methods 100 and 200.

At step 302 it is determined if either the right or left turn signal is activated in vehicle V1, which can be in the form of a signal from a turn signal indicator or sensor, and if activated method 300 proceeds to step 304, otherwise method 300 proceeds to step 306.

At step 304 traffic preemption takes place dependent upon the use of the turn signal and method 300 continues to be available to assist in the preemption of a predicted pathway. Step 304 effectively overrides a contrary pathway prediction. However, if the turn signal is in concert with the predicted path then the signal lights along that path are already in the mode of preempting their normal operation and the turn signal reinforces the already predicted travel path. As a result of arriving at step 304 lights in the selected direction will be preempted as vehicle V1 travels right at the next intersection, see FIG. 4, or left at the next intersection, see FIG. 3, as applicable.

At step 306, database 18 is queried by device 16 to see what the identified type of vehicle, the identified specific vehicle and/or the driver of the vehicle generally does at upcoming intersections. At step 308 that follows, if vehicle V1 historically turns at an upcoming intersection more than a predetermined percentage of the time then method 300 proceeds to the appropriate step 312L or 312R and if not then to step 310. The method then repeats.

At step 310, vehicle V1 is presumed to be heading in a straight direction and the lights in the straight direction are selected for preemption, since the historically right or left turn percentages are below the predetermined amount. Of course if vehicle V1 turns at the upcoming intersection then system 12 seeks to determine a new predicted pathway.

At step 312L, lights to the left as well as those in a straight path are all selected for preemption since there is a reasonably high probability that vehicle V1 will turn left. The preemption of both the straight forward direction as well as the left turn is to accommodate the two likely travel paths of vehicle V1 in this scenario.

At step 312R, lights to the right as well as those in a straight path are all selected for preemption since there is a reasonably high probability that vehicle V1 will turn right, in spite of the lack of use of the turn signal. The preemption of both the straight forward direction as well as the right turn is to accommodate the two likely travel paths of vehicle V1 in this scenario.

Figure 8:
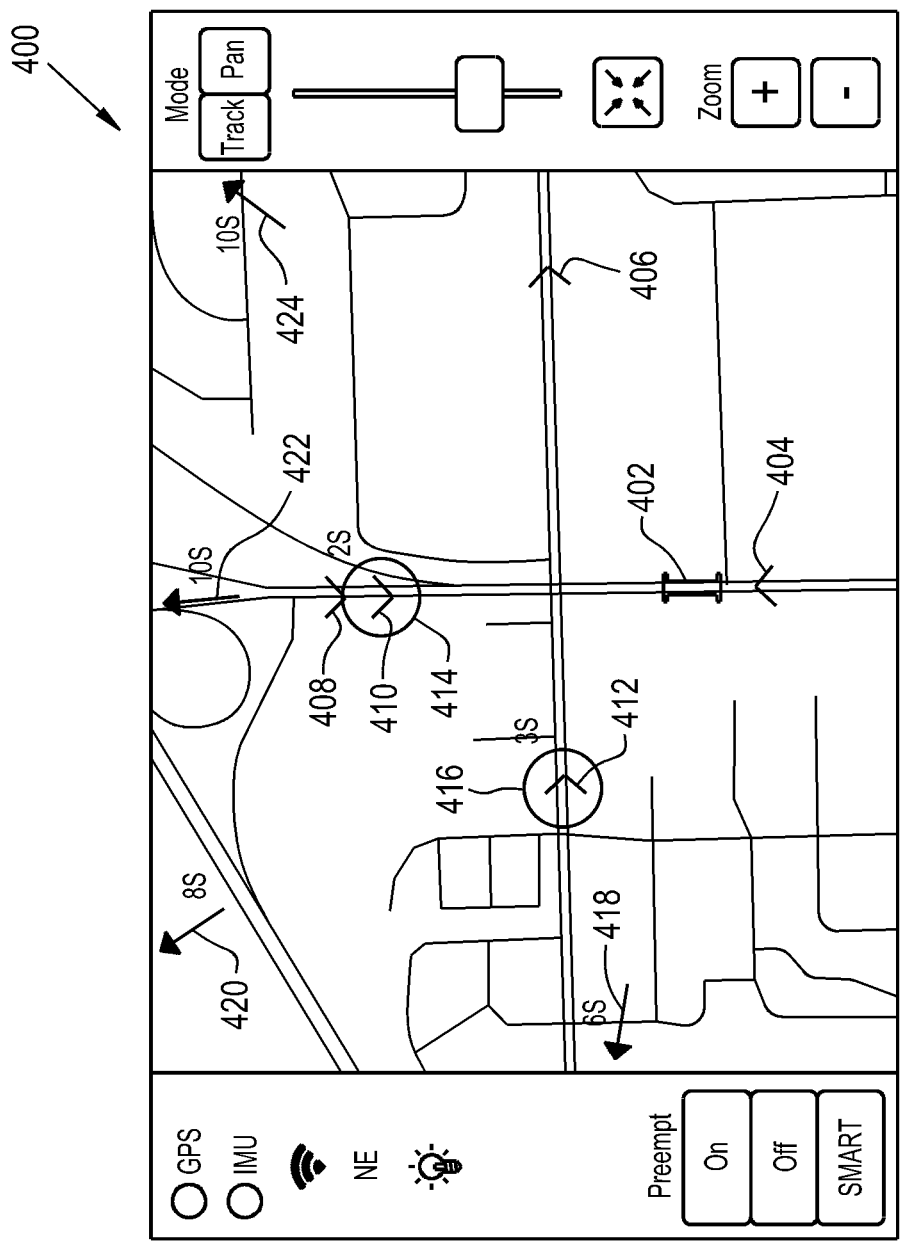
FIG. 8 illustrates two emergency vehicle locations, each having a circle around a directional chevron that indicates that they are within a collision avoidance trigger range.

Now additionally referring to FIGS. 8-20, there is shown a display 400, in FIG. 8, that illustrates, in part, how a collision avoidance system and a traffic light preemption system, collectively referred to as 12, functions. Display 400 includes graphical representations of vehicle 402, which is a first vehicle 402, which is carrying display 400 for reference to by a driver of first vehicle 402. Representations of vehicles 404, 406, 408, 410 and 412 are shown as chevrons, although other symbols are also contemplated, with the point of the chevrons indicating direction of travel of these other emergency vehicles, with emergency vehicles 410 and 412 respectively referred to as second vehicle 410 and third vehicle 412. As first vehicle 402 is moving in a direction upward on display 400, second vehicle 410 is moving toward first vehicle 402. Additionally third vehicle 412 is moving to the right toward an upcoming intersection of the routes being taken by first vehicle 402 and second vehicle 410. Collison avoidance and traffic light preemption system 12 will take action to preempt the function of a traffic signal at the intersection of the two routes in the middle of display 400, in favor of at least one of the vehicles 402, 410 and 412, as discussed herein, and additionally alert the driver of vehicle 402 of collision potential with second vehicle 410 and third vehicle 412. Here a circle 414 is displayed around second vehicle 410 along with "2S", indicating that in 2 seconds second vehicle 410 will be proximate to first vehicle 402 at the intervening intersection. In a similar manner a circle 416 surrounds third vehicle 412 with "3S" denoting that in 3 seconds third vehicle 412 will be proximate to first vehicle 402.

The situation of emergency vehicles being proximate to each other particularly at an intersection where the normal function of a traffic signal is being preempted for an emergency vehicle can lead to an assumption that the intersection is cleared for them and can lead to a collision of the emergency vehicles. To avoid such situations the present invention identifies when emergency vehicles are likely to be proximate to each other at traffic signals that are about to or are having their normal functions preempted, and provide indications of potential conflicts at an intersection so that the drivers can adjust accordingly. In the situation shown in FIG. 8 on display 400 vehicles 410 and 412 will be proximate to vehicle 402 respectively within 2 seconds and 3 seconds. This allows the driver of vehicle 402 to be alert at the upcoming intersection to ensure that a collision is avoided. Likewise similar displays in vehicles 410 and 412 will have alerted those drivers of the proximity of vehicle 402. Since emergency vehicle 406 is not headed for the intersection, its presence is noted, but is not highlighted with a circle. Also, vehicle 408, although it is headed for the traffic signal/intersection that is of interest it is outside of the predetermined time interval in which it will likely be proximate to vehicle 402, so it does not have a circle surrounding it. However, it may be that on the display in vehicle 412, the vehicle 408 will have a circle around it to alert the driver of vehicle 412 of vehicle 408.

Additionally there is shown in FIG. 8, directional indicators 418, 420, 422, and 424, along the perimeter of display 400, these indicate upcoming potential collision conflicts at upcoming traffic signals that are not yet displayed on display 400. For example, directional indicator 420 shows that in an estimated 8 seconds vehicle 402 will be proximate another emergency vehicle at an off-screen traffic signal/intersection, with the directional indicator, in the form of an arrow 420 pointing to a current unseen location in the direction indicated. This all being on a likely predicted route that is anticipated to be taken by first vehicle 402 as well as the likely predicted routes taken by the other emergency vehicles, as discussed herein.

Figure 9:
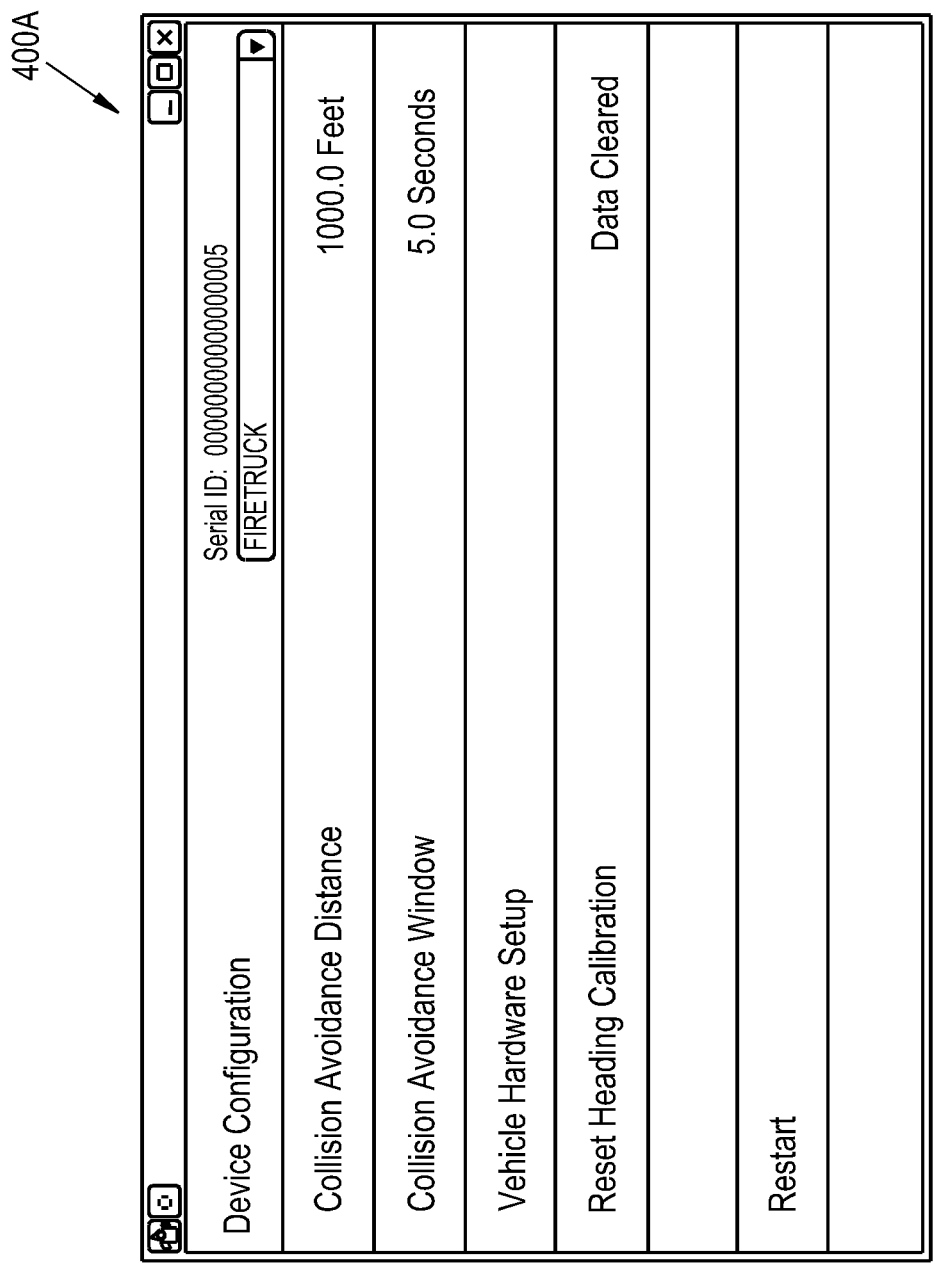
FIG. 9 illustrates a setup screen to configure the vehicle device's collision trigger settings relative to the display in FIG. 8.

A display of a configuration screen 400A is shown in FIG. 9, where the configuration of vehicle 402 is identified as a firetruck, and information regarding the collision avoidance distance, and avoidance window time are displayed. With the phrases also serving as selections on the touch screen of the display to set up other features of the present invention.

Figure 10:
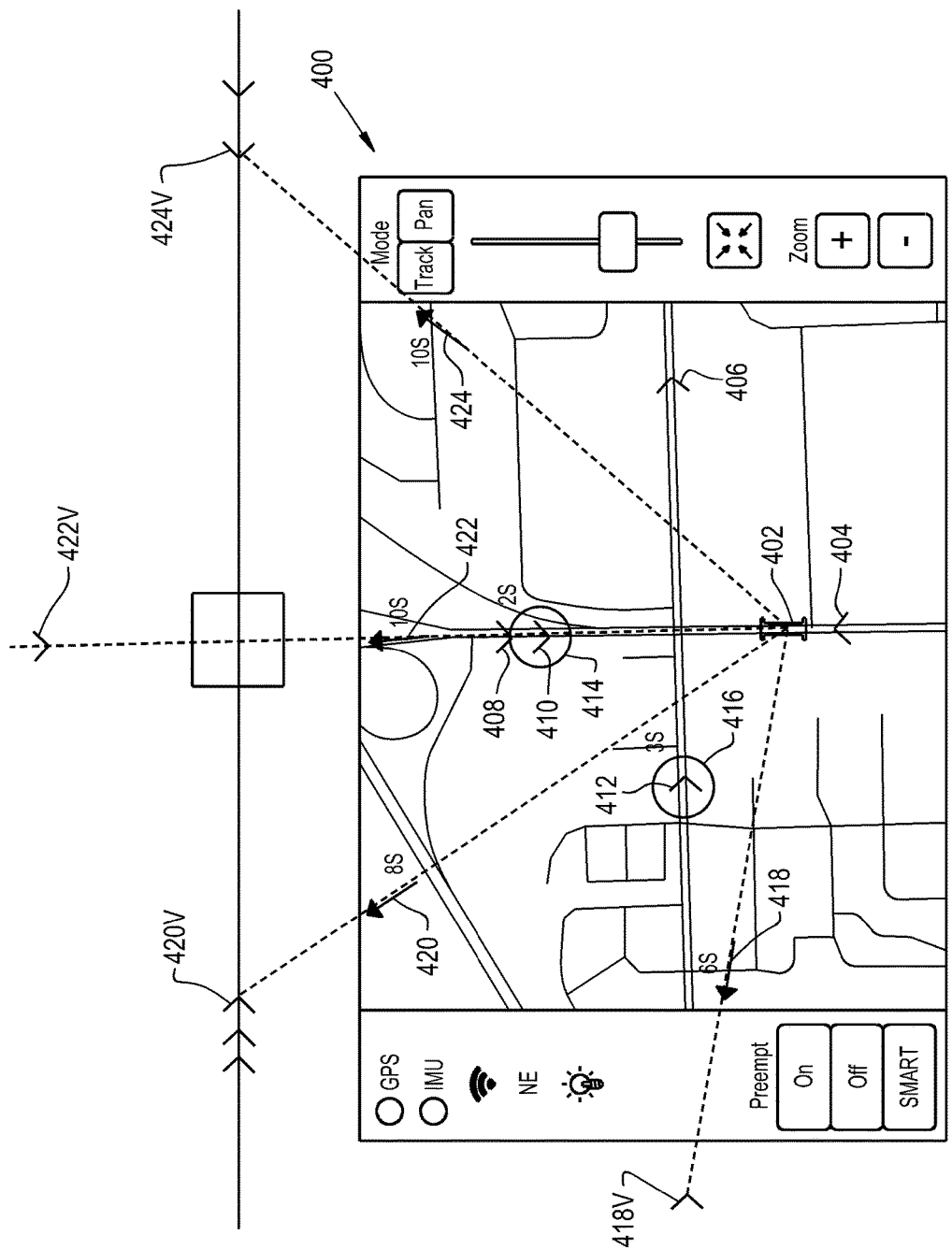

FIG. 10 depicts in a schematic manner aspects of the off screen positioning of emergency vehicles 418V, 420V, 422V and 424V that are referred to onscreen by way of directional indicators 418, 420, 422 and 424. For example, at an upcoming intersection, illustrated as a box above screen 400, vehicle 420V is anticipated to be proximate both the intersection and vehicle 402 in 8 seconds. In a like manner, vehicle 422V is predicted to be proximate to the intersection and vehicle 402 in 10 seconds. And, likewise, vehicle 424V is predicted to be proximate to the intersection and vehicle 402 in 10 seconds.

Figure 11:
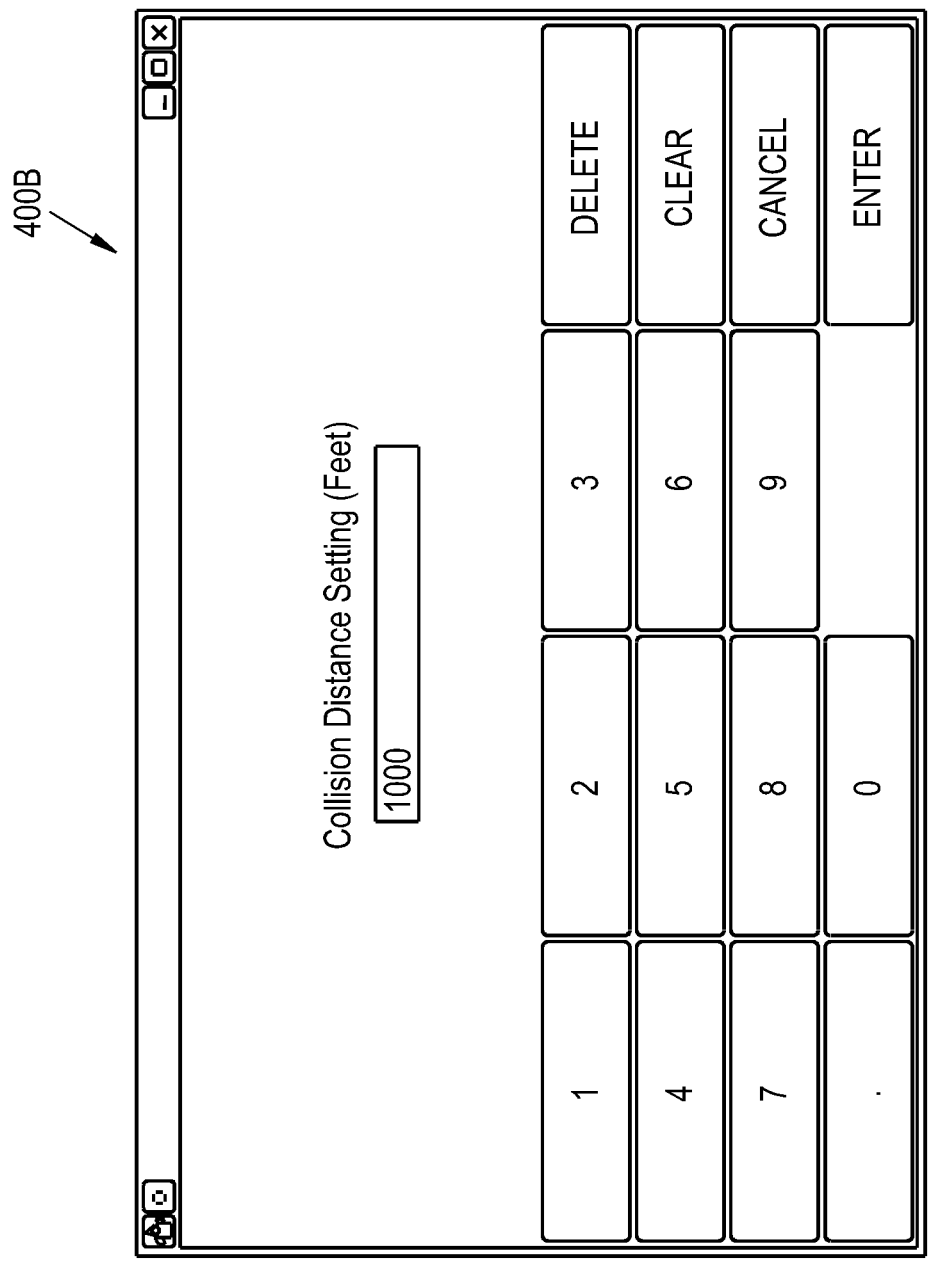
FIG. 11 illustrates an entry screen that will appear upon touching the words "Collision Avoidance Distance" on the screen depicted in FIG. 9, where the distance trigger is digitally entered.

In FIG. 11 a screen 400B is illustrated where the collision avoidance distance that was selected on screen 400A is entered. This advantageously allows for the configuration of system 700, in each emergency vehicle to be configured to the features and limitations of the vehicle. On screen 400C (FIG. 12), the collision avoidance window in seconds is input, which was selected from the text of the screen 400A.

Figure 13:
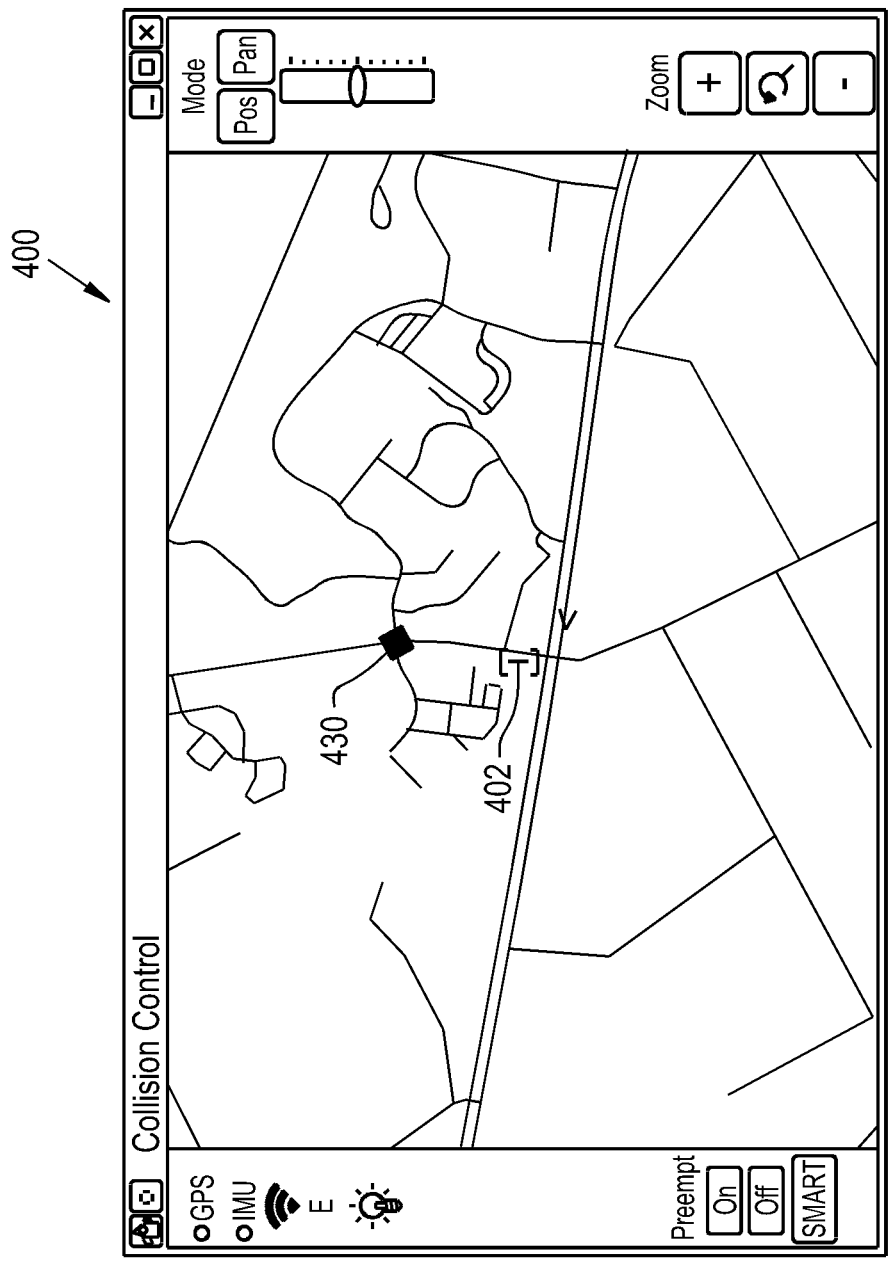
FIG. 13 illustrates the use of a diamond symbol, which may be green, to represent a traffic signal that has received and acted upon a preemption request sent by the invention.

In FIG. 13 with a new map displayed on display 400, there is shown a diamond 430 at an intersection. The diamond 430 may be colored green, for example, to indicate that this upcoming intersection has been preempted in favor of vehicle 402, which is of course from the perspective of the driver of vehicle 402. While in FIG. 14 a diamond 432, is colored red to indicate that the intersection has a traffic light preemption that is favored for another vehicle in circle 434. Here a circle 436 surrounds vehicle 402 in order to further alert the driver that his vehicle is not the favored vehicle at the upcoming intersection.

Figure 15:
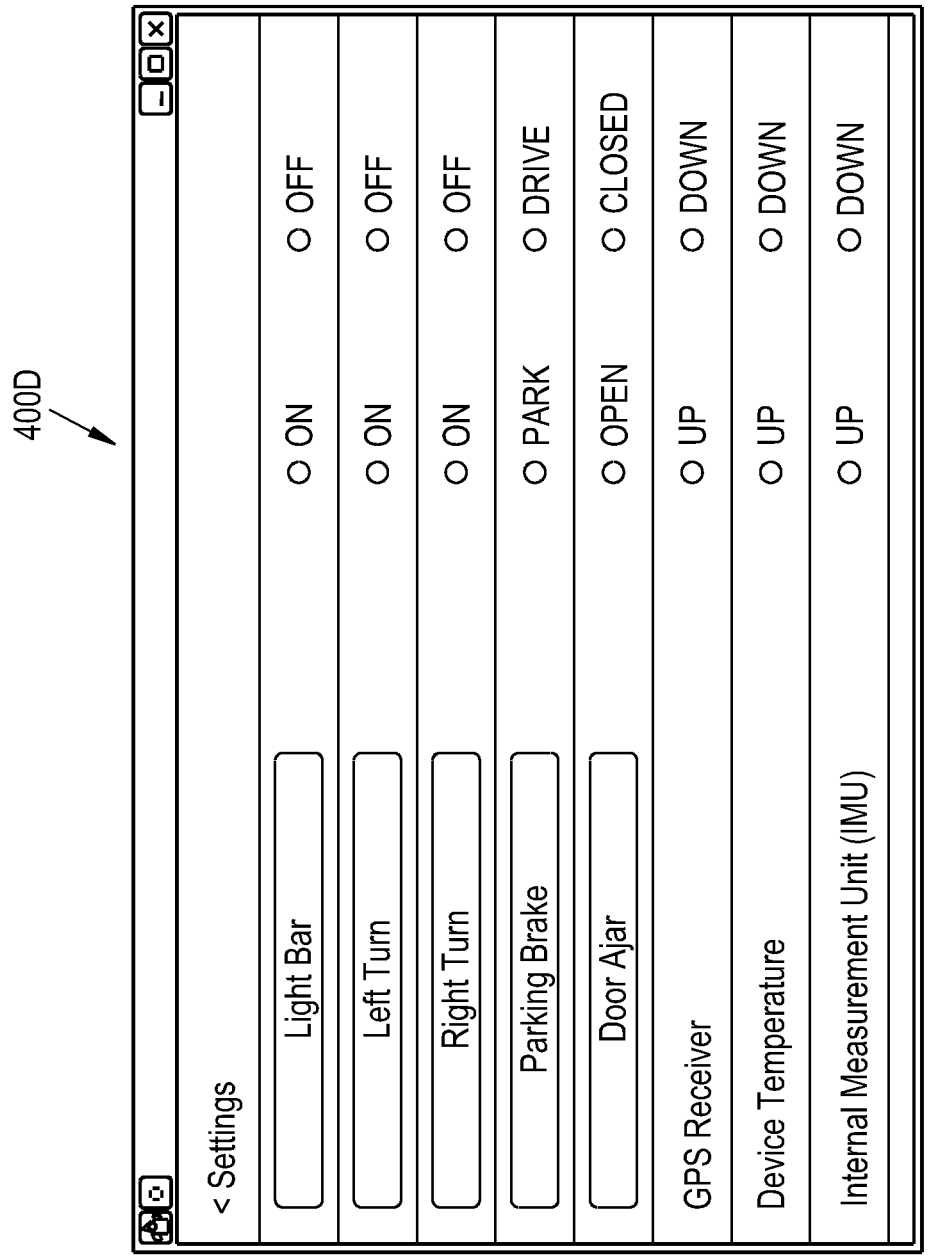
FIG. 15 illustrates a setup screen that will appear upon touching the words "Vehicle Hardware Setup" on the screen depicted in FIG. 9, which allows a technician during setup to confirm that the system is properly sensing the status of various inputs to the present invention.
Figure 16:
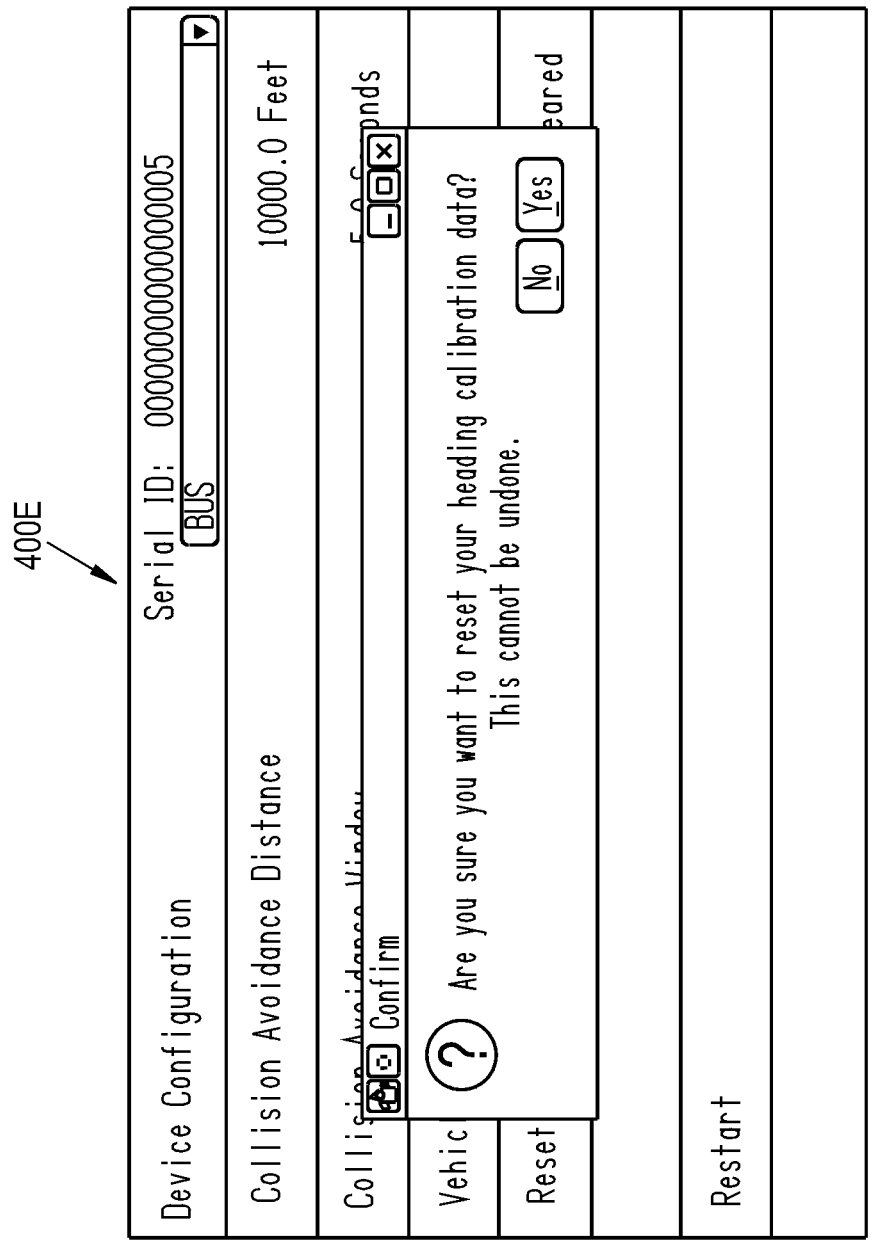
FIG. 16 illustrates a confirmation screen when operational parameters of the present invention are to be updated, with a version of the screen of FIG. 9 in the background.
Figure 17:
FIG. 17 illustrates a blank data entry screen of a "TrafficLightDefinition.rtf" file template to define Geo windows.

In FIG. 15, there is depicted some configuration information for system 700, which allows inputs that can differ from vehicle to vehicle to be electrically connected and then be correctly interpreted by the present invention. For example, if the light bar of one emergency vehicle has a high signal when on and another vehicle has a low signal when on, the detector can be configured from screen 400D to provide the correct information to system 700 even though the level of the signals are contrary to each other. Screen 400E of FIG. 16 illustrates the confirmation of the changes, which may also involve a security feature to prevent unauthorized personnel from changing the configuration elements.

Screens 400F and 400G illustrate the establishing of geo windows that may take place either in system 600 or system 700, to define the latitude and longitude of the geo windows, for use by the present invention.

Figure 19:
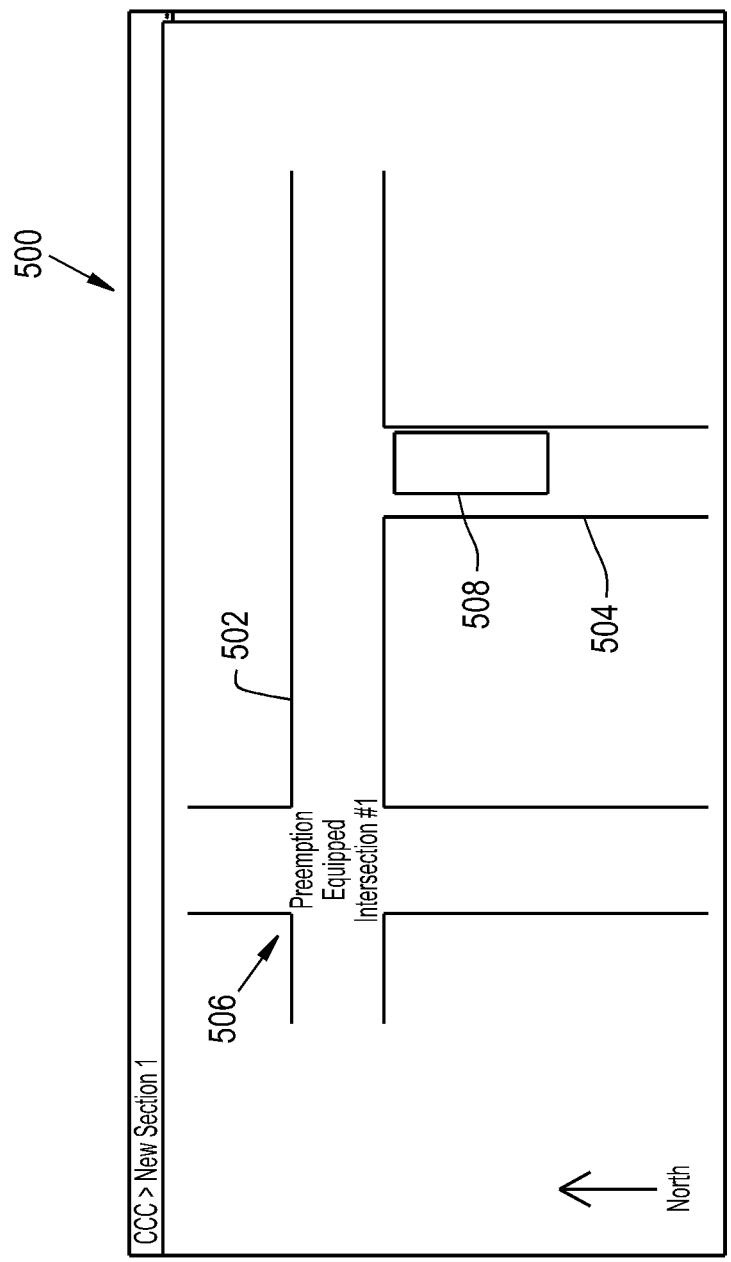
FIG. 19 illustrates details of a Geo window with the present invention have a set of operating protocols related to the Geo window.

In FIG. 19 there is shown an illustration 500 of roadways including streets 502 and 504 with an intersection 506 that is equipped with a traffic signal preemption device. An established geo window 508 is a boundary, which when a vehicle is therein initiates some of the functions of the present invention. For example if an emergency vehicle is traveling north bound in geo window 508 and has a left turn signal on then the traffic signal at intersection 506 will function to clear traffic for the vehicle. Alternatively, if the vehicle is southbound on street 504, and is in geo window 508 and has a left turn signal on, then the traffic signal at intersection 506 is not preempted. For the sake of simplicity only one GEO window 508 is depicted to better illustrate another aspect of the present invention. However, the intersection would typically have four GEO windows on the main approaches and those four GEO windows are not dependent on a turn signal. The GEO window 508 is an additional one that requires a turn signal to activate. However it is also contemplated that it could also activate only in the absence of a turn signal. Again looking at FIG. 19, instead of the left turn signal activating a west bound preemption, it could also be that a right turn signal would result in no preemption and a left turn or NO turn signal would result in a west bound preemption. This is most useful at intersections near fire stations, EMS stations, and police stations to allow the emergency vehicle access to those locations with reduced or no traffic flow.

Figure 20:
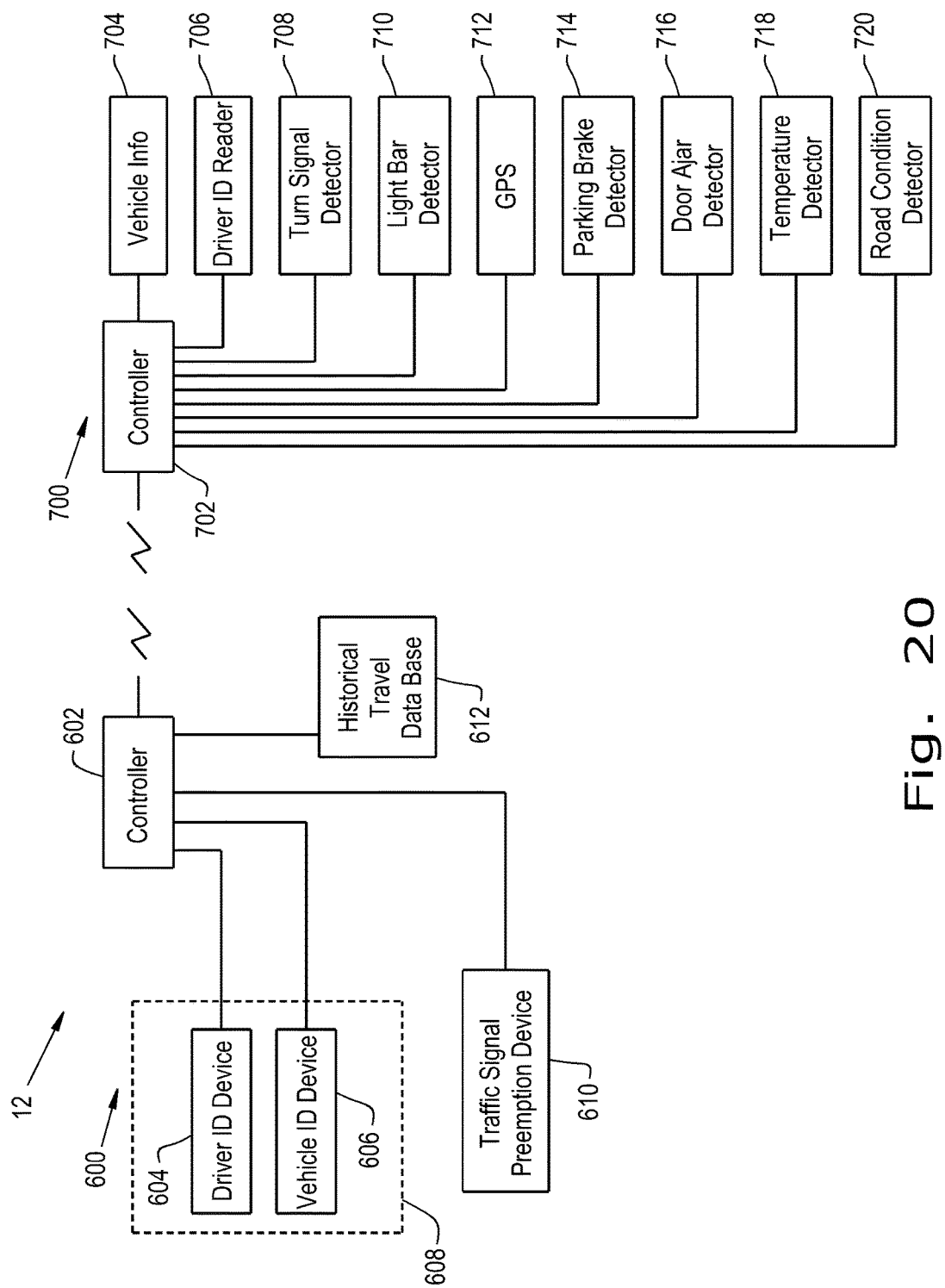
FIG. 20 is a schematical block diagram depicting devices of the present invention that carry out the functions of the present invention depicted in the foregoing drawings and the related text of the specification.

In FIG. 20, there is illustrated one embodiment of collision avoidance and traffic light preemption system 12 is carried out. System portion 600 may be centralized and interface with multiple system portions 700. System 700 can be located in each emergency vehicle and interfaces with display 400 to convey information to the driver. System portion 600 includes a controller 602 that interfaces with the controller 702. Controller 602 is in communication with a driver ID device 604 and a vehicle ID device 606, which together can be considered as an identification device 608, which allows for the identification of specific emergency vehicles or there types of vehicles and for the identification of drivers of the vehicles. Controller 602 is also in communication with traffic signal preemption devices 610 and an historical travel database 612. Traffic signal preemption devices 610, may be considered to exist at each traffic light intersection, or may be part of a centralized control.

System portion 700, is implemented in each vehicle and controller 702 interfaces with vehicle information 704, a driver ID reader 706, a turn signal detector 708, a light bar detector 710, a GPS system 712, a parking brake detector 714, a door ajar detector 716, a temperature detector 718, a road condition detector 720, and any other sensors that may be a part of an emergency vehicle.

The advanced notifications of potentially impending collisions of the present invention is a useful tool for the emergency vehicle driver. The following outlines the method and programming of the collision avoidance system 12 for emergency vehicles which also preempts traffics signals.

This is merely one method of programming and using a graphic user interface (GUI) to facilitate and more easily control the programming and function of a GPS 712 based emergency vehicle traffic signal preemption and collision avoidance system 12.

Vehicle System

FIG. 8 shows one iteration of a GUI, on display 400 giving useful information to the emergency vehicle driver. It conveys valuable long range collision avoidance information to the emergency vehicle driver. The "I Beam" 402 (in the lower center of FIG. 8) shows the relative position of the vehicle 402, with the chevrons 404, 406, 408, 410 and 412 depicting location and direction of travel of other emergency vehicles in the area. It should be understood that different shapes and colors of icons could be used to depict different classes of emergency vehicles. Time to proximity with each of these vehicles is calculated and displayed in red text on display 400. Circles 414 and 416, which may have a red color, around two of the chevrons 410 and 412 indicate that they are within the collision avoidance trigger range. The trigger range is configured by the user (in units of both time and distance). FIG. 9 depicts what a setup screen could look like to configure the vehicle device's collision trigger settings.

Figure 12:
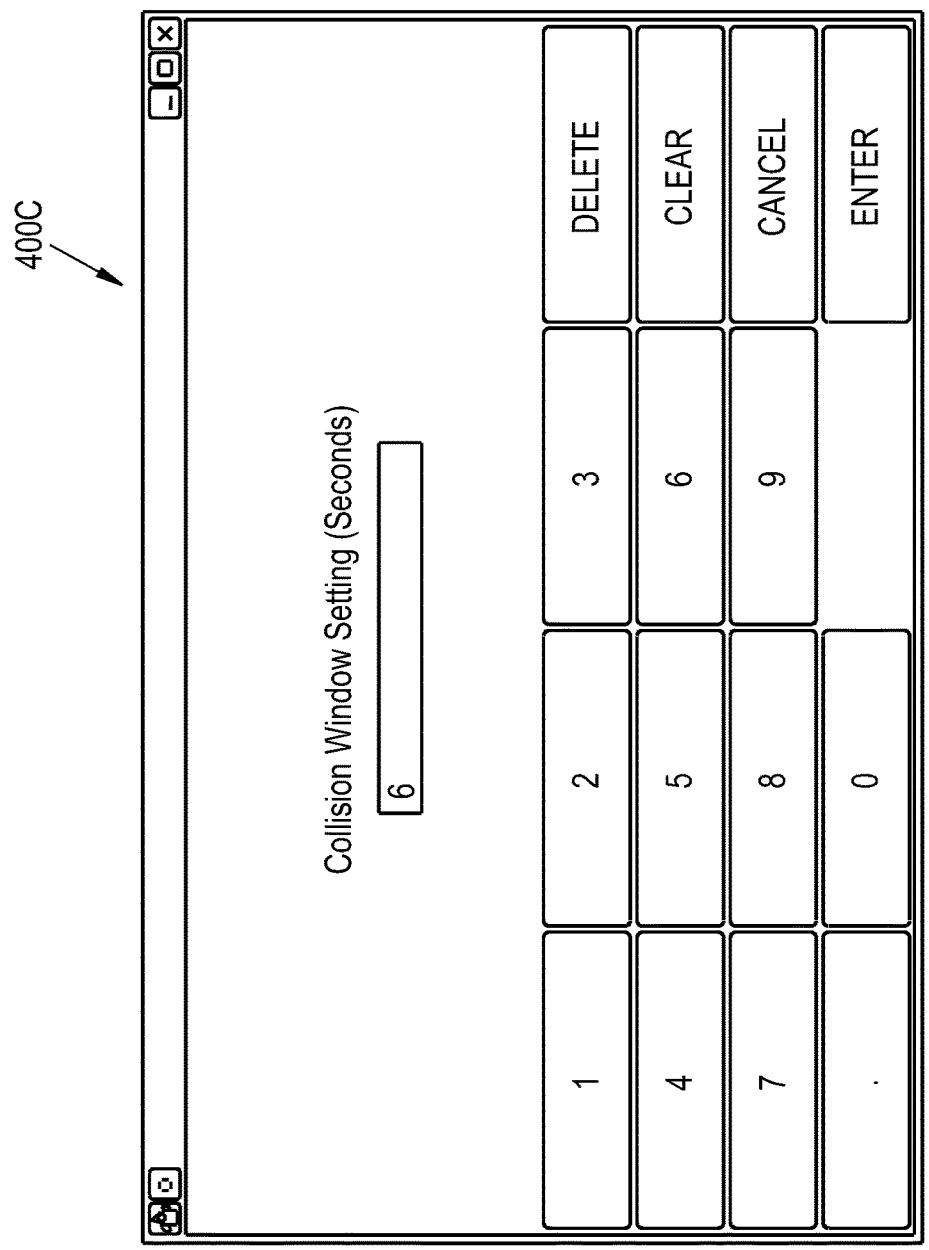
FIG. 12 illustrates an entry screen that will appear upon touching the words "Collision Avoidance Window" on the screen depicted in FIG. 9, where the collision avoidance window can be digitally set.

Touching the words "Collision Avoidance Distance" takes you to a screen shown in FIG. 11, where the distance trigger is digitally entered. Likewise, touching the words "Collision Avoidance Window" takes the user to a screen such as the one shown in FIG. 12, where the collision avoidance window can be digitally set. In FIG. 12, setting the time to 6 seconds, will provide for any vehicles that you will miss colliding with by less than 6 seconds will trigger an alarm for (and a red circle will surround) that vehicle depicted on display 400. The trigger range in the case shown in FIG. 9 is set to alert the driver to collisions within either 5 seconds or 1000 feet. Potential collisions that satisfy either of those criteria will have their icons circled in red, with a circle like circles 414 and 416.

In FIG. 9 if you touch the words "Vehicle Hardware Setup" on the screen, you will be taken to the screen shown in FIG. 15. This allows a technician during setup to confirm that the system is properly sensing the status of the light bar detector 710, the left and right turn signals detector 708, the parking brake detector 714, the door detector 716, the GPS 712, and the device temperature 718.

FIG. 15 can indicate that the light bar is currently on. However if the light bar is currently off, the technician need only touch the "on" button next to "Light Bar", and the system is now properly configured without requiring the technician to reverse the polarity of the input wire from the light bar. Likewise is true for these other "troubleshooting" settings. The screen in FIG. 15 also depicts what may be shown if neither turn signal is activated, the emergency vehicle's transmission is in drive, all doors to the vehicle are closed, and GPS, the device temperature, and system 700 are all properly functioning.

Touching the screen in FIG. 9 where it says "Reset Heading Calibration" will clear stored GPS data, and allow the vehicle system to be used "freshly" (devoid of GPS anomalies stored from its use in any previous vehicles, and allowing it to re-calibrate properly). This is followed by the confirmation screen shown in FIG. 16. The words "Data Cleared" indicate this process has been successful.

Touching the screen in FIG. 9 where it says "Restart" will restart the device.

Again the (red) arrows 418, 420, 422 and 424 near the edge of the screen in FIG. 8 depict "off-map" potential collisions. FIG. 10 shows the actual positions of the "off-map" vehicles, which cannot be seen in FIG. 8, and how their arrows relate to the locations of these other vehicles with which the driver is likely to collide.

Icons on the upper left side of the screen in FIG. 8 indicate the status of (from top to bottom) the GPS, the IMU (Inertial Measurement Unit), the Radio, the Compass heading, and whether the Light Bar is On or Off. Icons on the lower left indicate preemption mode status (On/Off/Smart).

In one mode of operation (referred to above as "smart mode") the system 600/700 will automatically preempt traffic signals without any user intervention required. In smart mode, the vehicle will automatically begin preempting traffic signals when the following conditions are satisfied:
1. The vehicle is determined to be within range to begin turning a traffic signal green in favor of the vehicle's direction of travel.
2. The light bar is engaged.
3. None of the doors on the vehicle are opened.
4. The parking brake is not applied.
5. The vehicle's transmission is in "Drive".

When any of the above conditions are NOT satisfied (while in smart mode), preemption is deactivated. Also, "Off" mode manually deactivates preemption, and "On" mode is the same as "smart" mode, except that the light bar does not need to be activated for preemptions to occur. "On" mode may be useful, for example, by a police vehicle that does not wish to announce its presence with the use of its light bar, but still wishes the use of the preemption feature.

The upper right hand quadrant of buttons depicted in FIGS. 8 and 10 control the track and pan of the screen. This allows the user to see portions of the surrounding area that would not otherwise be shown on the screen. The button directly below the "track/pan" slider (depicting four arrows pointing toward the center of the button) instantly re-centers the display to that shown in FIG. 8.

Figure 14:
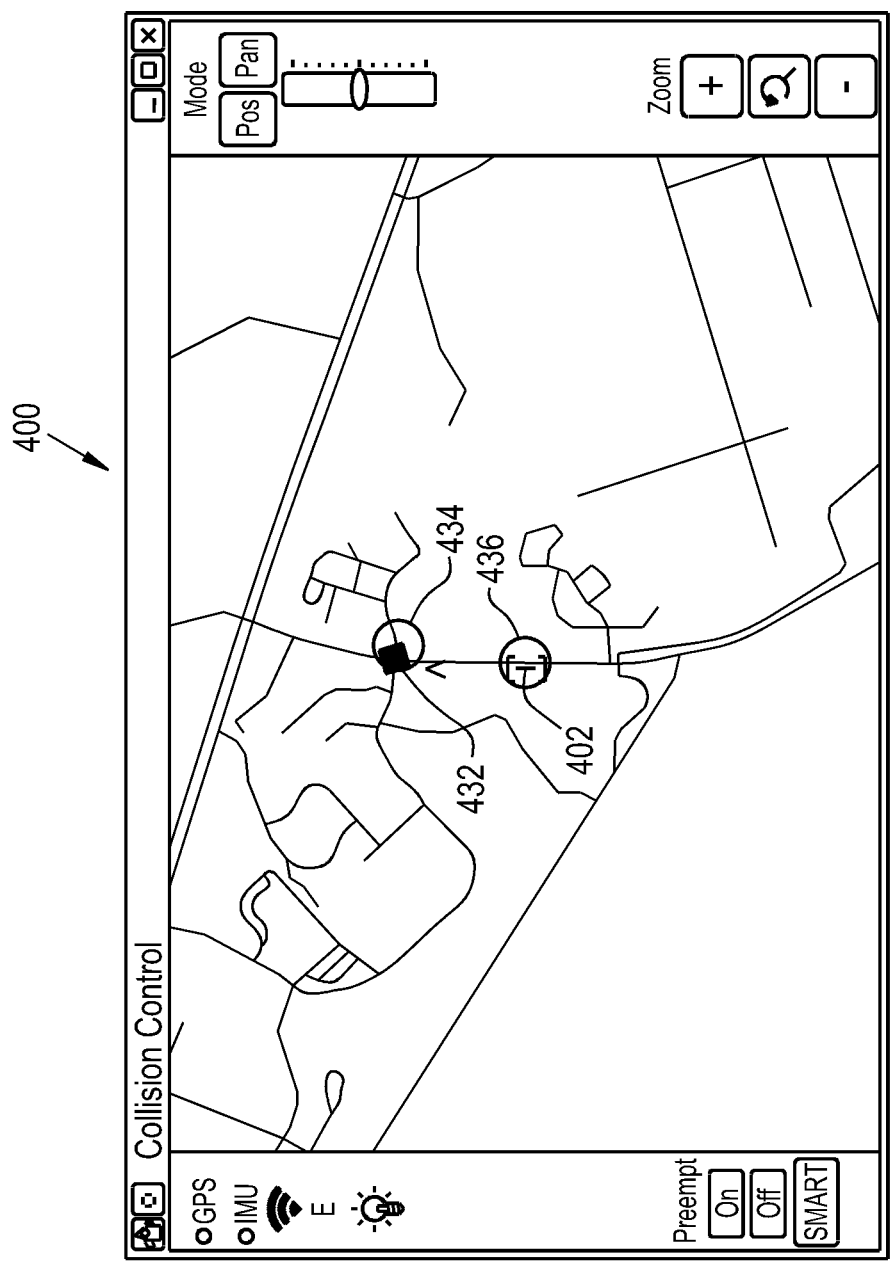
FIG. 14 shows another diamond symbol, which may be red, to indicate that the traffic signal has been successfully preempted in favor of a different vehicle which is just exiting the intersection ahead.

The GUI of the present invention can also show the status of nearby traffic signals. In FIG. 13, the diamond 430 (which can be green) represents a traffic signal that has received and acted upon a preemption request. FIG. 14 diamond 432 (which may be red), indicates that the traffic signal has been successfully preempted in favor of a different vehicle which is just exiting the intersection ahead.

Traffic Signal System

The traffic signal system is such that it does not require a GPS antenna to know its location. This can save considerably in the manufacturing cost of the Traffic Signal System. Each traffic signal intersection can be programmed using Google Earth, for example, to "know" where it is located, using conventional coordinates for latitude/longitude. Additionally, the traffic signals are programmed to work on "geo windows" (drawing a polygon surrounding the intersection to determine when preemption will be activated) or ETA (preempting based on estimated time of arrival at the intersection). One method of programming a traffic signal follows.

| Step | Description |
|---|---|
| 1) | If Google Earth is not installed, navigate to https://www.google.com/intl/en/earth/download/ge/agree.html to download Google Earth |
| | Select [Agree and Download] |
| | Open your download folder and execute the 'GoogleEarthSetup.exe' file |
| | Follow instructions to install Google Earth |
| | Make a copy of the "TrafficLightDefinition.rtf" file template (Fig 17), and name it to reflect the name of the intersection you are programming (Fig 18). |
| 2) | In the [Search] text field, enter the address or the latitude/longitude of the intersection of interest |
| | Select the [Search] button |
| | Confirm the map is at the location of interest |
| 3) | Select the [Thumb Tac] button shown on the left |
| | Place the [Thumb Tac] at the center of the intersection |
| | Enter [Name:] for the placemark dialog and select [OK] |
| | Go to "Tools" then "Options" then 3D view then Under "Show Lat/Lon" check "Decimal Degrees". |
| | Add the Lat and Lon of center point to the *.RTF file |
| 4) | Select the [Ruler] |
| | Select the center of the Thumb Tac on the map and draw a line down the intersection |
| | Enter the heading for your first intersect angle definition in the open Traffic Light Definition RTF |
| | Save it in a word document. |
| | Repeat this step for at least four intersect angles or upwards of eight if necessary (Fig. 18) |
| 5) | If defining GEO windows, select the icon to the left |
| | On the map, select the four points that represent the GEO window. NOTE: Only define four points |
| | Enter [Name:] for the new path dialog |
| | Repeat this for at least four GEO window definitions (Fig. 18). |
| 6) | From the [Places] control select the GEO window definition from step 5 |
| | Right-click [the Place] and select [Copy] |
| | Open Notepad and select [Paste] |
| | Copy the latitude/longitude definitions that exist within the <coordinates></coordinates> tag |
| | Paste the values into the RTF GEO window definition. |
| | Ensure no spaces exist at the beginning/end or between the latitude/longitude definitions. |
| | Eliminate any '0' that exist between the latitude/longitude definition |
| | Only four point definitions should exist for a GEO window definition |
| | Repeat this step for the remaining GEO window definitions |
| 7) | Note: If utilizing GEO windows, you must define both intersect angles (0-3) and GEO windows (0-3) for the device to work properly. The utilization of GEO windows occurs by setting the 'StaticDevice.IsETA=false'. |
| | Specify the following information in the file from a traffic definition RTF: |
| | #Utilized if the MAC address cannot be determined: |
| | Device.SerialNumber=000000000000000 |
| | #Value=Latitude; Longitude (degrees) |
| | StaticDevice.Location=41.043716;−85.235665 |
| | StaticDevice.StreetInfo=Engle Road |
| | #true for intersect angles, false for intersect angles and GEO windows |
| | StaticDevice.IsETA=true |
| | #Value=Integer number in feet |
| | StaticDevice.MinPreemptionDistanceFeet=300 |
| | #Value=Integer as seconds |
| | StaticDevice.ETAThresholdSeconds=25 |
| | #Value=Angle From North (degrees) |
| | StaticDevice.IntersectAngle0=35.68 |
| | StaticDevice.IntersectAngle1=215.57 |
| | StaticDevice.IntersectAngle2=123.96 |
| | StaticDevice.IntersectAngle3=286.98 |
| | StaticDevice.IntersectAngle4=NOT_SET |
| | StaticDevice.IntersectAngle5=NOT_SET |
| | StaticDevice.IntersectAngle6=NOT_SET |
| | StaticDevice.IntersectAngle7=NOT_SET |
| | #Value=StartLatitude;StartLongitude;EndLatitude;EndLongitude;Width (feet) decimal form |
| | StaticDevice.GeoWindow0=41.044485;−85.235609;41.043614;−85.235856;41.043559;−85.235643;41.04439;−85.235308 |
| | StaticDevice.GeoWindow1=41.043614;−85.235856;41.042813;−85.232958;41.043284;−85.232878;41.043831;−85.235736 |
| | StaticDevice.GeoWindow2=41.043831;−85.235736;41.043186;− |

-continued

| Step | Description |
|---|---|
| | 85.236082;41.043158;−85.235882;41.043559;−85.235643 |
| | StaticDevice.GeoWindow3=41.044413;−85.237539;41.043559;−85.235643;41.043755;−85.235439;41.044669;−85.237217 |
| | StaticDevice.GeoWindow4=NOT_SET |
| | StaticDevice.GeoWindow5=NOT_SET |
| | StaticDevice.GeoWindow6=NOT_SET |
| | StaticDevice.GeoWindow7=NOT_SET |
| | COPY File To Static Unit |
| 8) | Change directory to the CCC System BIN directory: |
| | cd /home/pi/CCC System/config |
| 9) | Copy the PROPERTIES file from the thumb drive to the configuration directory: |
| | sudo cp [Media Drive Location]/*.properties. |
| | Validate the Settings |
| 10) | Change directory to the CCC System BIN directory: |
| | cd /home/pi/CCC System/bin |
| 11) | Execute the diagnostic command: |
| | sudo ./cccStartup.sh static_hw_tech |
| 12) | Test executes validating the properties file and then reports via STDOUT the status of the attached supporting hardware. Any errors will report as an EXCEPTION. Correct as necessary and re-execute this procedure. |
| 13) | Reassemble, reboot the device, or power off when completed |

The steps of a method of avoiding collisions and preempting traffic signals, include predicting a first likely travel route of a first vehicle 402 along established roadways; predicting a second likely travel route of a second vehicle 410 along the established roadways; preempting a normal operation of at least one traffic signal at an intersection of roadways along at least one of the first likely travel route and the second likely travel route allowing at least one of the first vehicle and the second vehicle to traverse the intersection; and determining whether both the first vehicle 402 and the second vehicle 410 will be at the intersection within a predefined time interval of each other.

The sending information to a receiving device 702 is depicted in FIG. 20 and information is sent to controller 702 in the first vehicle 402 and also the second vehicle 410. The information includes an estimated amount of time until the first vehicle 402 will be proximate to the second vehicle 410.

An alert is provided to an operator of the first vehicle 402 if the determining step indicates that the first vehicle 402 will be proximate to the second vehicle 410 within the predefined time interval in the intersection. The alert can be visual, audible or mechanical, such as a vibration in a portion of the driver's seat.

The estimated amount of time, such as 2 seconds depicted in FIG. 8 for vehicle 410 until the first vehicle 402 will be proximate to the second vehicle 410, the displaying taking place on at least one display 400 in the first vehicle 402. Directional indicators 418, 420, 422, and 424 are overlaid on a map on the display 400 of the first vehicle 402 indicating a direction to a current position of the second vehicle 418V, 420V, 422V, or 424V. The estimated amount of time is associated with the directional indicators 418, 420, 422, and 424 on the map on the display 400 of the first vehicle 402. This is undertaken while the current position of the second vehicle 418V, 420V, 422V, or 424V places it beyond a boundary of the map being displayed on the display 400 of the first vehicle 402.

The method of avoiding collisions and preempting traffic signals, further including the steps of identifying the first vehicle 402 or an operator of the first vehicle 402; and arriving at what the first likely travel route is of the identified first vehicle 402 or the identified operator dependent upon previous travel routes of the identified first vehicle 402 or the identified operator; and executing the preempting of the normal operation of a traffic signal dependent upon the first likely travel route. The identifying step can also identify a type of the first vehicle 402, such as it being an ambulance, which will influence the like route determination if the ambulance is going in a general direction toward a hospital.

The collision avoidance and traffic signal preemption system 12 has a travel route prediction device 600 predicting a first likely travel route of a first vehicle 402 along established roadways and a second likely travel route of a second vehicle 410 along the established roadways. A traffic signal preemption device 610 preempting a normal action of a traffic signal at an intersection of the roadways along at least one of the first likely travel route and the second likely travel route allowing at least one of the first vehicle 402 and the second vehicle 410 to traverse the intersection. Controller 602 determines the information as to whether both the first vehicle 402 and the second vehicle 410 will be at the intersection within a predefined time interval of each other.

Receiving device 702 in the first vehicle 402 and/or the second vehicle 410, receives the information from the controller 602. The information includes an estimated amount of time until the first vehicle 402 will be proximate to the second vehicle 410. An alert device (display 400) provides an alert to an operator of the first vehicle 402 if the first vehicle 402 will be proximate to the second vehicle 410 within the predefined time interval in the intersection. Display device 400 in the first vehicle 402 displays the estimated amount of time until the first vehicle 402 will be proximate to the second vehicle 410.

The collision avoidance and traffic signal preemption system 12 also includes at least one identification device 608 for identification of the first vehicle 402 and/or a driver of the first vehicle 402; and a historical travel database including records of routes previously taken by the first vehicle 402 or the driver, the travel route prediction device 602 using the records of routes to predict the first likely travel route.

While a system for collision avoidance and directional control and the flow of traffic has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of avoiding collisions and preempting traffic signals, comprising the steps of:
    predicting a first likely travel route of a first vehicle along established roadways;
    predicting a second likely travel route of a second vehicle along the established roadways;
    preempting a normal operation of at least one traffic signal at an intersection of roadways along at least one of the first likely travel route and the second likely travel route allowing at least one of the first vehicle and the second vehicle to traverse the intersection;
    determining whether both the first vehicle and the second vehicle will be at the intersection within a predefined time interval of each other;
    sending information to a receiving device in the first vehicle and to a receiving device in the second vehicle, the information including an estimated amount of time until the first vehicle will be proximate to the second vehicle;
    displaying the estimated amount of time until the first vehicle will be proximate to the second vehicle, the displaying taking place on at least one display in the first vehicle;
    overlaying a directional indicator on a map on the display of the first vehicle indicating a direction to a current position of the second vehicle; and
    associating the estimated amount of time to the directional indicator on the map on the display of the first vehicle, wherein the overlaying step and the associating step are carried out while the current position of the second vehicle places it beyond a boundary of the map being displayed on the display of the first vehicle.

2. The method of claim 1, further comprising the step of providing an alert to an operator of the first vehicle if the determining step indicates that the first vehicle will be proximate to the second vehicle within the predefined time interval in the intersection.

3. The method of claim 1, further including the steps of:
    identifying at least one of the first vehicle and an operator of the first vehicle; and
    arriving at what the first likely travel route is of the identified first vehicle or the identified operator dependent upon previous travel routes of the identified first vehicle or the identified operator; and
    executing the preempting step dependent upon the first likely travel route.

4. The method of claim 3, wherein the identifying step identifies a type of the first vehicle.

5. The method of claim 1, further comprising a turn signal detector for the first vehicle configured to provide a turn signal indication signal, with the preempting step preempting the normal action of traffic signals dependent upon the turn signal indication signal.

6. The method of claim 5, wherein the turn signal indication signal causes the method to not use the first likely travel path.

7. The method of claim 1, wherein the predicting steps use previous travel routes contained in a historical travel database to determine the first likely travel route and the second likely travel route, the historical travel database includes both historical travel data when the first vehicle is using the method and when the first vehicle is not using the method.

8. A collision avoidance and traffic signal preemption system, comprising:
    a travel route prediction device predicting a first likely travel route of a first vehicle along established roadways and a second likely travel route of a second vehicle along the established roadways;
    a traffic signal preemption device preempting a normal action of a traffic signal at an intersection of the roadways along at least one of the first likely travel route and the second likely travel route allowing at least one of the first vehicle and the second vehicle to traverse the intersection;
    a controller to determine the information as to whether both the first vehicle and the second vehicle will be at the intersection within a predefined time interval of each other;
    a receiving device in the first vehicle receives the information including an estimated amount of time until the first vehicle will be proximate to the second vehicle; and
    a display device in the first vehicle, the estimated amount of time until the first vehicle will be proximate to the second vehicle being displayed on the display in the first vehicle, wherein a directional indicator is overlaid on a map on the display of the first vehicle indicating a direction to a current position of the second vehicle, the estimated amount of time is associated with the directional indicator on the map on the display of the first vehicle, wherein the directional indicator is pointing to the second vehicle even though the second vehicle is located such that its position is beyond a boundary of the map being displayed on the display of the first vehicle.

9. The collision avoidance and traffic signal preemption system of claim 8, further comprising an alert device to provide an alert to an operator of the first vehicle if the first vehicle will be proximate to the second vehicle within the predefined time interval in the intersection.

10. The collision avoidance and traffic signal preemption system of claim 8, further comprising:
    at least one identification device for identification of the first vehicle and/or a driver of the first vehicle; and
    a historical travel database including records of routes previously taken by the first vehicle or the driver, the travel route prediction device using the records of routes to predict the first likely travel route.

11. The collision avoidance and traffic signal preemption system of claim 10, wherein the identification device identifies a type of the first vehicle.

12. The collision avoidance and traffic preemption system of claim 8, further comprising a turn signal detector for the first vehicle configured to provide a turn signal indication signal to the traffic signal preemption device for preempting the normal action of traffic signals dependent upon the turn signal indication signal.

13. The collision avoidance and traffic preemption system of claim 12, wherein the turn signal indication signal causes the traffic signal preemption device to not use the first likely travel route.

14. The collision avoidance and traffic preemption system of claim 8, further comprising a historical travel database that includes both historical travel data when the first vehicle is using the traffic preemption system and when the first vehicle is not using the traffic preemption system.

\* \* \* \* \*